(12) United States Patent
Heo et al.

(10) Patent No.: US 7,480,269 B2
(45) Date of Patent: Jan. 20, 2009

(54) METHOD AND APPARATUS FOR SCHEDULING UPLINK DATA TRANSMISSION USING UE-ID IN A MOBILE COMMUNICATION SYSTEM SUPPORTING UPLINK PACKET DATA SERVICE

(75) Inventors: Youn-Hyoung Heo, Suwon-si (KR); Gert Jan Van Lieshout, Middlesex (GB); Ju-Ho Lee, Suwon-si (KR); Joon-Young Cho, Suwon-si (KR); Young-Bum Kim, Seoul (KR); Yong-Jun Kwak, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 11/267,580

(22) Filed: Nov. 7, 2005

(65) Prior Publication Data

US 2006/0114877 A1 Jun. 1, 2006

(30) Foreign Application Priority Data

Nov. 5, 2004 (KR) ............. 10-2004-0090043
Nov. 9, 2004 (KR) ............. 10-2004-0091119
Nov. 15, 2004 (KR) ............. 10-2004-0092963

(51) Int. Cl.
*H04Q 7/00* (2006.01)
(52) U.S. Cl. ............. 370/328; 370/318; 370/311
(58) Field of Classification Search ............. 370/332, 370/311, 318, 328
See application file for complete search history.

(56) References Cited

U.S. PATENT DOCUMENTS

2006/0056355 A1* 3/2006 Love et al. ............. 370/332

OTHER PUBLICATIONS

Ericsson: "E-DCH Scheduling—Way Forward" 3GPP TSG-RAN WG1 #38, R1-040959, 'Online! Aug. 16, 2004 pp. 1-5, XP002367153 Retrieved from the Internet: URL: http://www.3gpp.org/ftp/tsg_ran/WG1_RL1/TSGR1_38/Docs/Zips/> 'retrieved on Feb. 10, 2006!.

(Continued)

*Primary Examiner*—Duc Nguyen
*Assistant Examiner*—Wayne Cai
(74) *Attorney, Agent, or Firm*—Roylance, Abrams, Berdo & Goodman, L.L.P.

(57) ABSTRACT

A method and apparatus for controlling an uplink data rate, without increasing downlink signaling overhead, in a mobile communication system that supports an uplink packet data service. A Node B transmits an Absolute grants (AG) using one of first and second IDs to a User Equipment (UE). Upon receipt of an AG with the first UE-ID, the UE transmits uplink data within an allowed maximum data rate indicated by the AG and receives a Relative Rrant (RG) in the next Transmission Time Interval (TTI). Upon receipt of an AG with the second UE-ID, the UE does not receive an RG.

28 Claims, 15 Drawing Sheets

OTHER PUBLICATIONS

Samsung: "EUL scheduling: signaling support" 3GPP TSG-RAN WG1 #38BIS, R1-041084, 'Online! Sep. 20, 2004-Sep. 24, 2004 pp. 1-7, XP002367154 Retrieved from the Internet: URL: http://www.3gpp.org/ftp/tsg_ran/WG1_RL1/TSGR1_38bis/Docs/> 'retrieved on Feb. 10, 2006!.

Samsung "Node B Controlled Scheduling" 3GPP TSG-RAN WG1 #38, R1-040851, 'Online! Aug. 16, 2004-Aug. 20, 2004 pp. 1-10, XP002367155 Retrieved from the Internet: URL: http://www.3gpp.org/ftp/tsg_ran/WG1_RL1/TSGR1_38/Docs/Zips> 'retrieved on Feb. 10, 2006!.

3GPP: "Technical Specification Group Radio Access Network; FDD Enhanced Uplink; Physical Layer Aspects (Release 6)" 3GPP TR 25.808 VO. 2.3, 'Online! Oct. 2004 pp. 1-20, XP002367156 Retrieved from the Internet: URL: http://www.3gpp.org/ftp/Specs/archive/25_series/25.808/> 'retrieved on Feb. 10, 2006!.

Siemens: "EDCH Identity Priority" 3GPP TSG-RAN WG2 #43, R2-042494, 'Online! Nov. 15, 2004-Nov. 19, 2004 pp. 1-2, XP002367157 Retrieved from the Internet: URL: http://www.3gpp.org/ftp/tsg_ran/WG2_RL2/TSGR2_43/Docs/> 'retrieved on Feb. 10, 2006!.

Anonymous, "TrCH processing: physical layer aspects", 3GPP TSG-RAN WG1 Meeting #38bis, R1-041085, Seoul, Korea, Sep. 20-24, 2004.

Anonymous, "TP on downlink control channel in support of E-DCH", 3GPP TSG-RAN1 #38, R1-041245, Seoul, Korea, Sep. 20-24, 2004.

Anonymous, "Scheduling related downlink signaling", 3GPP TSG-RAN WG1 Meeting #39, R1-41369, Shin-Yokohama, Japan, Jan. 15-19, 2004, pp. 1-3.

* cited by examiner

METHOD AND APPARATUS FOR SCHEDULING UPLINK DATA TRANSMISSION USING UE-ID IN A MOBILE COMMUNICATION SYSTEM SUPPORTING UPLINK PACKET DATA SERVICE

CROSS-REFERENCE TO RELATED APPLICATION

This application claims priority under 35 U.S.C. § 119 (a) of Korean Patent Application No. 2004-90043, filed Nov. 5, 2004, in the Korean Intellectual Property Office, Korean Patent Application No. 2004-91119, filed Nov. 9, 2004, in the Korean Intellectual Property Office, and Korean Patent Application No. 2004-92963, filed Nov. 15, 2004, in the Korean Intellectual Property Office, the entire disclosures of each are hereby incorporated by reference.

BACKGROUND OF THE INVENTION

1. Field of the Invention

The present invention relates to a mobile communication system supporting an uplink packet data service. More particularly, the present invention relates to a method and apparatus for scheduling uplink data transmission for a User Equipment (UE) that uses an enhanced uplink dedicated transport channel.

2. Description of the Related Art

Universal Mobile Telecommunication Service (UMTS) is a 3rd generation mobile communication system that uses WCDMA and is based on the European Global System for Mobile communications (GSM) system. UMTS provides mobile subscribers a uniform service for the transmission of packet-based text, digitized voice, video and multimedia data at or above 2 Mbps irrespective of their geographic location. With the introduction of the virtual access concept, UMTS allows access to any end point within a network at any time. Virtual access refers to packet-switched access using a packet protocol like Internet Protocol (IP).

The UMTS system uses a transport channel called Enhanced Uplink Dedicated CHannel (EUDCH or E-DCH) in order to provide improved packet transmission performance for uplink communications from a UE to a Node B (or base station). To increase high-speed data transmission stability, Adaptive Modulation and Coding (AMC), Hybrid Automatic Repeat reQuest (HARQ), and Node B-controlled scheduling have been added to E-DCH transmissions.

AMC is a technique for adaptively selecting a modulation and coding scheme (MCS) according to channel conditions between a Node B and a UE. A plurality of MCS configurations can be defined in accordance with the available modulation and coding schemes. The adaptive selection of an MCS configuration according to channel conditions increases resource use efficiency.

HARQ is a packet retransmission scheme for retransmitting a packet to correct errors in a previously transmitted packet. HARQ comprises Chase Combining (CC) and Incremental Redundancy (IR). In CC, the retransmitted packet is in the same format as the previously transmitted packet, whereas in IR, the previously transmitted packet and the retransmitted packet are formatted differently.

Node B-controlled scheduling is a scheme in which a Node B determines whether to permit E-DCH transmission for a UE. When IE-DCH transmission is permitted, an allowed maximum data rate is determined and data rate information is transmitted to the UE. Based on the data rate information, the UE determines an available E-DCH data rate.

FIG. 1 illustrates an uplink data transmission on the E-DCH in a typical mobile communication system. Reference numeral 110 denotes a Node B supporting E-DCH and reference numerals 101 to 104 denote UEs using E-DCH. As illustrated, UEs 101 to 104 transmit data to Node B 110 on E-DCHs 111 to 114.

Node B 110 individually notifies UEs of E-DCH transmission being allowed by transmitting to the UEs scheduling grants and E-DCH data rate information, based on buffer occupancy information, requested data rate and channel condition information received from the UEs. This operation is called scheduling of uplink data transmission. The scheduling is performed such that the measured increase in Node B's noise does not exceed a noise increase threshold, thus enhancing total system performance. For example, low data rates are allocated to remote UEs, such as UEs 103 and 104, whereas high data rates are allocated to nearby UEs, such as UEs 101 and 102. UEs 101 to 104 determine their allowed maximum data rates for E-DCH data based on the scheduling grants and transmit the E-DCH data at the determined data rates.

The uplink signals of the different UEs interfere with one another due to asynchronization of the signals. Reception performance of a Node B increasingly suffers as the numbers of uplink signals increases. The compromised reception performance occurs when the numbers of uplink signals increases because as the numbers of uplink signals increases so does the amount of interference on the uplink signal of any given UE. This problem can be overcome by increasing the uplink transmit power of the UE. However, in doing so, the increased transmit power in turn serves as interference to other uplink signals. Thus, the reception performance would still be compromised at the Node B. The total power of uplink signals received at the Node B needs to be limited in order to maintain acceptable reception performance. Rise Over Thermal (ROT) represents uplink radio resources used by the Node B is defined as $$ROT = I_o / N_o \qquad (1)$$

where $I_o$ denotes a power spectral density over a total reception band, that is, the total power of all uplink signals received at the Node B. $N_o$ denotes the thermal noise power spectral density at Node B. Therefore, an allowed maximum ROT represents the total uplink radio resources available to Node B.

The total ROT is expressed as the sum of inter-cell interference, voice traffic and E-DCH traffic. With Node B-controlled scheduling, simultaneous transmission of packets at high data rates by a plurality of UEs is prevented, thus maintaining the total ROT at or below a target ROT so as to ensure acceptable reception performance at all times. When high data rates are allowed for particular UEs, they are not allowed for other UEs in the Node B-controlled scheduling. Consequently, the total ROT does not exceed the target ROT.

In the case where many UEs are using the E-DCH service in one cell, the overhead of downlink signaling for scheduling grants must be considered in Node-controlled scheduling. For a large number of UEs using the E-DCH, the downlink power consumption of the Node B increases when transmitting scheduling grants and the number of downlink channelization codes increases to receive the scheduling grants. As a result, the whole downlink capacity of the cell decreases.

Accordingly, there is a need for a technique that reduces downlink signaling overhead when transmitting scheduling grants involved in Node B-controlled scheduling so as to increase downlink capacity.

SUMMARY OF THE INVENTION

An aspect of the present invention is to address at least the above problems and/or disadvantages and to provide at least the advantages described below. Accordingly, an aspect of the present invention is to provide a method and apparatus for minimizing signaling overhead from scheduling an uplink packet data service in a Node B.

Another aspect of the present invention is to provide a method and apparatus for effectively transmitting a scheduling grant using a common identifier (ID) and a dedicated ID, with reduced downlink signaling overhead, in a Node B that provides an uplink packet data service on an uplink dedicated channel.

A further aspect of the present invention is to provide a method and apparatus for effectively receiving in a UE a scheduling grant that a Node B transmits with minimized downlink signaling overhead.

The above aspects are achieved by providing a method and apparatus for controlling an uplink data rate without increasing downlink signaling overhead in a mobile communication system that supports an uplink packet data service.

According to one aspect of the present invention, in a method of scheduling uplink data transmission of an UE in a mobile communication system that supports an uplink packet data service, the UE is allocated a first UE-ID and a second UE-ID for scheduling uplink data transmissions. The UE receives from a Node B an AG indicating the absolute value of an allowed maximum data rate for uplink data transmission, and determines whether the AG has the first or second UE-ID. If the AG has the first UE-ID, the UE receives from the Node B an RG indicating a change in the allowed maximum data rate for uplink data transmission. If the AG has the second UE-ID, the UE neglects the RG received from the Node B. The UE transmits uplink data within an allowed maximum data rate decided by one of the AG and the RG.

According to another aspect of the present invention, in an apparatus for scheduling uplink data transmission in a UE in a mobile communication system supporting an uplink packet data service, an receiver receives an AG indicating the absolute value of an allowed maximum data rate for uplink data transmission from a Node B. A decider receives first and second UE-IDs allocated for scheduling of uplink data transmission and determines whether the AG has the first or second UE-ID. A controller manages the first and second UE-IDs, provides the first and second UE-IDs to the decider, and sets an RG reception mode to ON if the AG has the first UE-ID and the RG reception mode to OFF if the AG has the second UE-ID. Here, an RG indicates a change in the allowed maximum data rate for uplink data transmission, transmitted from the Node B. An RG receiver receives an RG from the Node B, if the RG reception mode is set to ON. An RG information decider provides a rate-up or rate-down command for an allowed maximum data rate to the controller according to the received RG.

According to a further aspect of the present invention, in a method of scheduling uplink data transmission for a UE in a Node B in a mobile communication system supporting an uplink packet data service, the Node B is allocated a first UE-ID and a second UE-ID for scheduling of uplink data transmission, determines an allowed maximum data rate for the UE, and selects one of the first and second UE-IDs to notify the UE of the allowed maximum data rate. Here, the first UE-ID indicates reception of an RG indicating a change in the allowed maximum data rate and the second UE-ID indicates non-reception of the RG. The Node B generates an AG indicating the allowed maximum data rate and adds the selected UE-ID to the AG. The Node B then transmits the AG with the selected UE-ID to the UE.

According to still another aspect of the present invention, in an apparatus for scheduling uplink data transmission for a UE in a Node B in a mobile communication system that supports an uplink packet data service. A scheduler manages first and second UE-IDs allocated for the scheduling of uplink data transmission, determines an allowed maximum data rate for the UE and selects one of the first and second UE-IDs to notify the UE of the allowed maximum data rate. The first UE-ID indicates the reception of an RG indicating a change in the allowed maximum data rate and the second UE-ID indicates non-reception of the RG. A rate information generator generates an AG indicating the allowed maximum data rate. An adder adds the selected UE-ID to the AG. A transmitter transmits the AG with the selected UE-ID to the UE.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

DETAILED DESCRIPTION OF EXEMPLARY EMBODIMENTS

Figure 1:
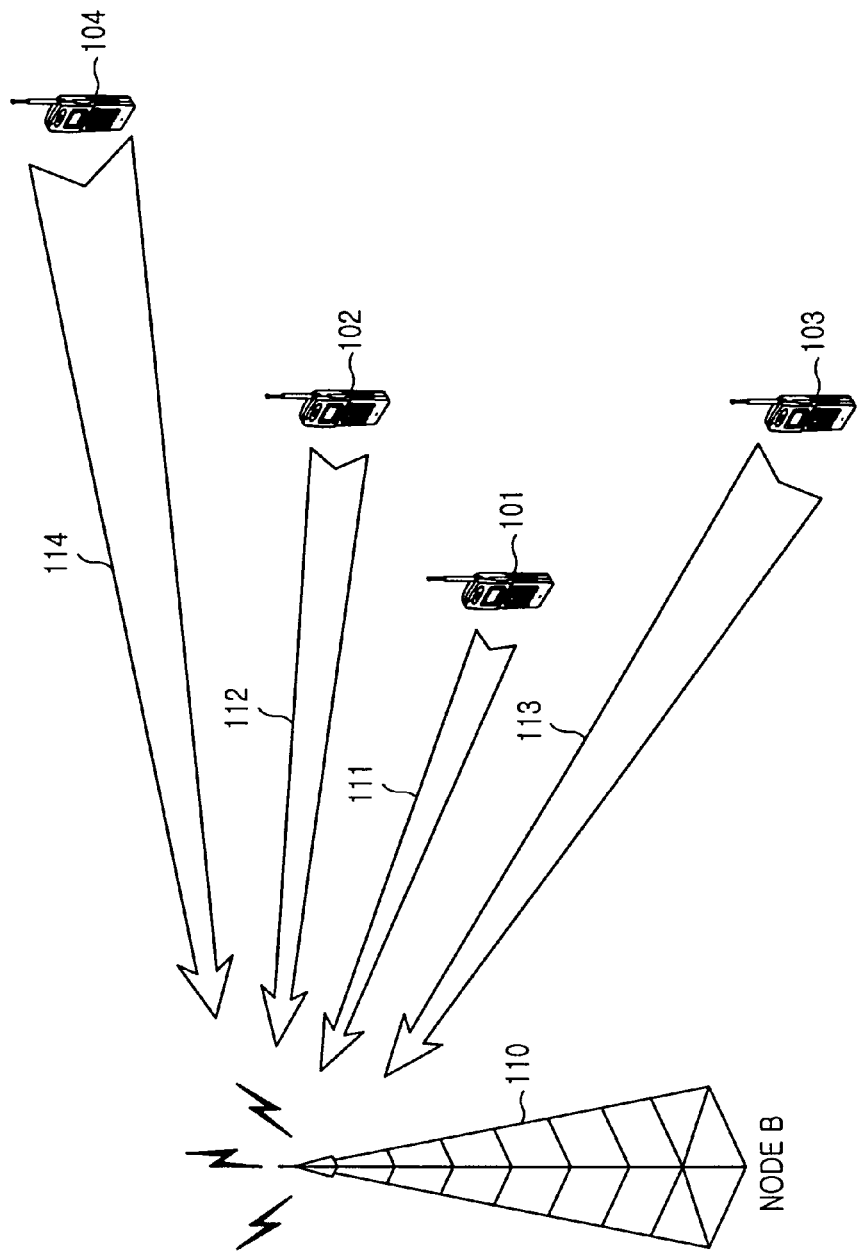
FIG. 1 illustrates uplink data transmission on an E-DCH in a typical mobile communication system.

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Embodiments of the present invention are characterized in that a Node B transmits scheduling grants to UEs with as little downlink signaling overhead as possible. Embodiments of the present invention are further characterized in that they operate in uplink packet data service supporting Node B-controlled scheduling, such as an E-DCH service in a WCDMA system.

There are two types of Node B-controlled scheduling, rate scheduling and time and rate scheduling. Rate scheduling increases or decreases a data rate for a UE, while time and rate scheduling controls a transmission/reception timing in addition to a data rate for a UE.

In the rate scheduling scheme, UEs can transmit data in each Transmission Time Interval (TTI) and their data rates are controlled by a Node B. Thus, the Node B transmits scheduling grants to the UEs for each TTI. If the scheduling grants are absolute grants (AGs) indicating the absolute values of data rates, there is too much overhead signaling. Thus, instead of AGs, the Node B signals relative grants (RGs) indicating UP/DOWN/KEEP to the UEs. An RG is one-bit of information. In the case of an RG set to KEEP, the Node B transmits the RG in a discontinuous transmission (DTX) mode. The rate scheduling scheme limits the increment or decrement of a data rate that the Node B can allow for one UE at one given instant. In other words, if the UE requests a very high data rate, the Node B increases the data rate of the UE stepwise by signaling an RG to the UE a plurality of times in a plurality of TTIs. Therefore, there is a long delay before the UE achieves its intended data rate.

A physical channel that carries an RG can be a dedicated channel or a common channel. In the rate scheduling scheme, every UE receives an RG in each TTI. When a dedicated channel carries RGs, it is processed in Code Division Multiplexing (CDM) by allocating UE-specific channelization codes to identify individual UEs or in Time Division Multiplexing (TDM) by allocating reception timings to the UEs. The channelization codes used for CDM of the dedicated channel are mutually orthogonal so that the UEs can be identified.

In the time and rate scheduling scheme, upon receipt of an AG as a scheduling grant from a Node B, a UE transmits E-DCH traffic based on the AG. Unless the UE receives an AG, it does not transmit E-DCH traffic. The AG indicates the absolute value of a data rate. The Node B can allocate a particular data rate to the UE for each TTI. For example, if the UE supports a data rate ranging from 8 kbps to 1 Mbps, the Node B can allocate 8 kbps to the UE for transmission in one TTI and 1 Mbps for transmission in the next TTI. If the Node B does not transmit a scheduling grant to the UE, it prevents E-DCH transmission from the UE or transitions the UE to an autonomous transmission mode in which the UE transmits data at a minimum data rate. Compared to the rate scheduling scheme, the time and rate scheduling scheme enables a one-time increase or decrease to a target data rate by a single scheduling grant, thereby reducing a time delay in scheduling.

AGs are carried on a common channel and their recipients are identified by UE-IDs. Since each UE-ID is masked with error detection information such as a Cyclic Redundancy Check (CRC) code, each AG contains a CRC specific to the UE-ID and the absolute value of a maximum allowed data rate for a corresponding UE. The UE performs a CRC check on a scheduling grant received on a common channel every scheduling period. If the scheduling grant is not for the UE, the CRC check fails and the UE discards the scheduling grant. If the CRC check passes, the UE adjusts its uplink data rate based on the scheduling grant.

The number of UEs to which the Node N transmits scheduling grants significantly increases in the cases where:

(1) a sudden increase in interference within the cell results in an increases in total ROT;

(2) UEs with higher priority levels request high data rates, while numerous other UEs simultaneously reduce their data rates; and (3) when it is possible to simultaneously receive uplink data from many UEs due to sufficient cell capacity.

In the above cases, both the scheduling schemes must consider uplink overhead arising from signaling scheduling grants. In the rate scheduling scheme, all UEs maintain code channels on which to receive RGs at all times and thus there is no need for new channelization codes despite the increase in the number of UEs. However, uplink transmit power for signaling RGs increases. On the other hand, under the same situation, new channelization codes are needed that may result in a lack of uplink code resources in the time and rate scheduling scheme. Considering the limited code resources in a cell, the uplink capacity of the cell eventually decreases.

In a third approach to reducing uplink signaling overhead, a common control scheduling scheme signals a common scheduling grant over the entire cell. If the ROT level of the cell is higher than a target ROT level set for E-DCH transmission, the Node B transmits a scheduling grant indicating DOWN to all UEs. Otherwise, the Node B transmits a scheduling grant indicating UP to the UEs. Despite the advantage of the decrease of signaling overhead by fewer signaling channels and less transmit power, the common control scheduling scheme cannot schedule individual UEs according to their priority levels or Quality of Service (QoS) data requirements.

In this context, a scheduling grant is delivered using a combined common signaling and dedicated signaling in accordance with preferred embodiments of the present invention. The Node B determines a data rate for each UE based on its requested data rate and UE status information in every scheduling period and then determines whether the scheduling grant will be transmitted by dedicated signaling or common signaling. The UE first monitors the presence or absence of a dedicated scheduling grant on a dedicated channel and in the absence of the dedicated scheduling grant, reads a common scheduling grant from a common channel.

Figure 2A:
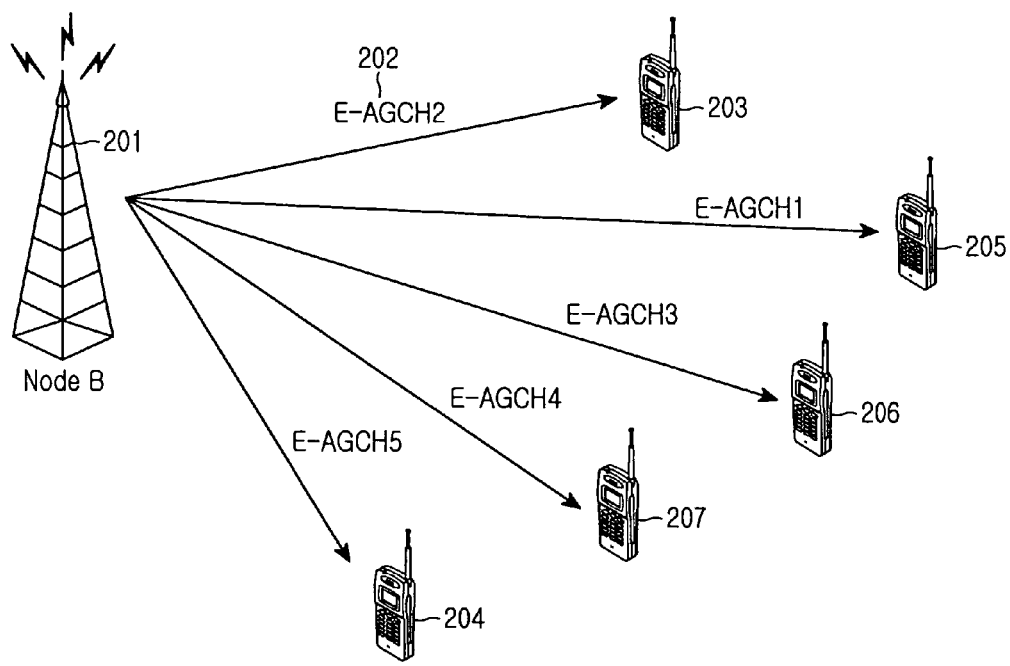
FIGS. 2A and 2B are views comparing transmission of individual scheduling grants to all UEs and transmission of a common scheduling grant to some UEs.
Figure 2B:
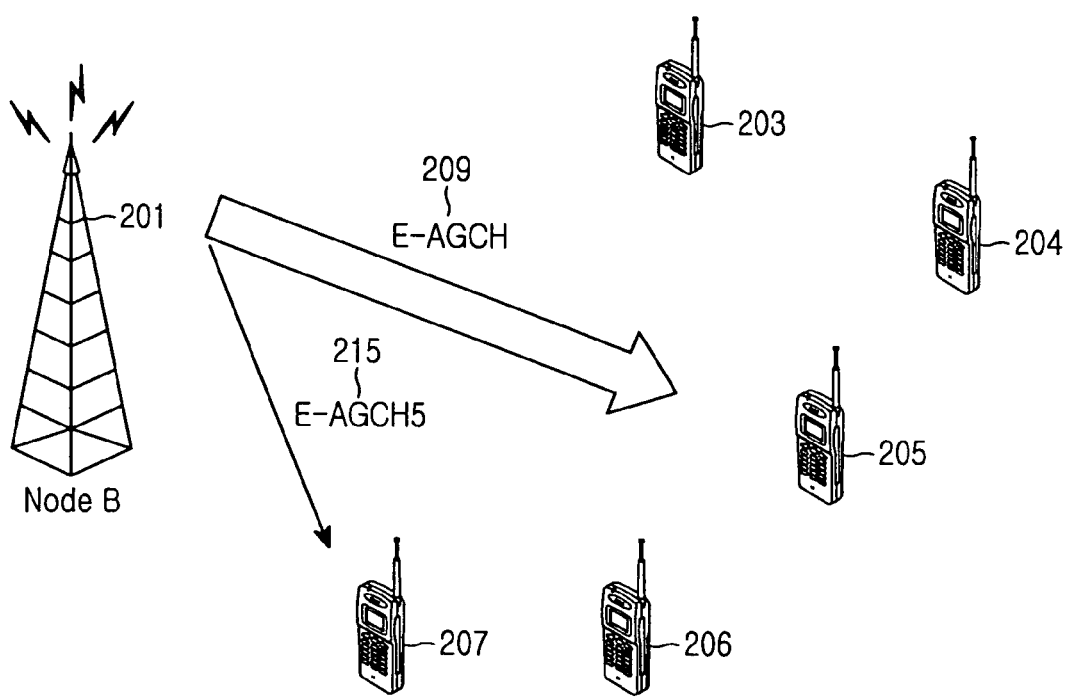

FIGS. 2A and 2B are views comparing transmission of individual scheduling grants to all UEs and transmission of a common scheduling grant to some UEs. An example of AGs being delivered to the UEs is illustrated in FIGS. 2A and 2B.

Referring to FIG. 2A, a Node B 201 transmits AGs on E-AGCHs 202 in order to schedule E-DCH data transmission. Since five UEs 203 to 207 (UE1 to UE5) use E-DCHs, five E-AGCHs 202, E-AGCH1 to E-AGCH5 are defined by UE-specific channelization codes or UE-specific TTIs. In every scheduling period, the Node B 201 determines data rates for UE1 to UE5 and transmits AGs indicating the data rates to them on the channels E-AGCH1 to E-AGCH5. In this case, up to five channels are needed to deliver AGs in each TTI.

If a UE with a higher priority level, for example, UE5 requests a high data rate, the Node B 201 allocates a high data rate to UE5, while allocating a common low data rate to UE1 to UE4. Thus, common signaling is used for UE1 to UE4, as illustrated in FIG. 2B.

Referring to FIG. 2B, the Node B 201 allocates a high data rate to UE5 via the dedicated signaling channel E-AGCH5, and a low data rate commonly to UE1 to UE4 on a common signaling channel E-AGCH 209. With the common signaling being used for part of the UEs, the number of channels to be transmitted simultaneously is decreased from 5 to 2.

First Embodiment

In a system where the uplink data rates of UEs are controlled by AGs, a radio network controller (RNC) allocates a common UE-ID and a dedicated UE-ID to each UE and a Node B transmits an AG to the UE by the common or dedicated UE-ID.

Figure 3:
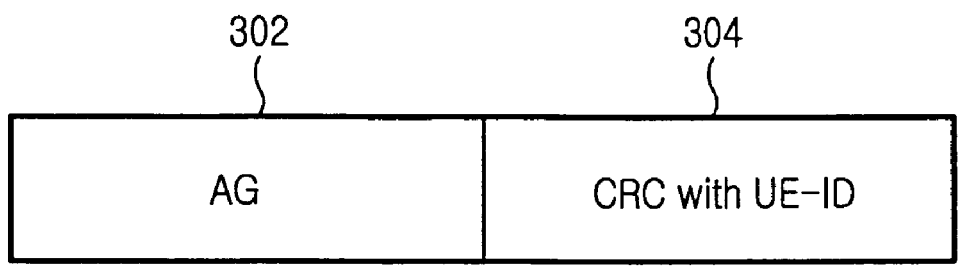
FIG. 3 illustrates the data format of an Enhanced uplink Absolute Grant CHannel (E-AGCH) for carrying an AG according to an embodiment of the present invention.

FIG. 3 illustrates the data format of an E-AGCH for carrying an AG according to an embodiment of the present invention.

Referring to FIG. 3, an AG 302 indicates the absolute value of an allocated allowed maximum data rate and a CRC field 304 provides a CRC masked with a UE-ID. Since the CRC 304 is masked with a specific UE-ID, the AG 302 is decoded only by a UE having the UE-ID and neglected by a UE with a different UE-ID due to CRC error. Alternatively, the UE-ID may be substituted for the CRC 304.

The E-AGCH can be configured in two ways to deliver an AG to a UE. The E-AGCH is configured in the above manner, that is, using a CRC masked with a UE-ID. Thus, the UE performs a CRC check using the CRC. Alternatively, the E-AGCH is configured to have a common CRC and a UE-ID inserted in E-AGCH data. After acquiring error-free E-AGCH data by a CRC check, the UE reads the E-AGCH data and checks a UE-ID. In this way, the UE determines whether the AG is for the UE or not.

At the start of E-DCH communications from a UE, an RNC allocates both a common UE-ID and a dedicated UE-ID to the UE by upper layer signaling. The RNC sets one common UE-ID for all UEs within a cell or for a group of UEs having the same service type, according to a Node B scheduling scheme and the E-DCH service types of the UEs. Thus, the Node B increase scheduling efficiency by using common signaling with a common UE-ID.

Besides using dedicated and common UE-IDs, the RNC can set an additional common control UE-ID to provide common control information to UEs. This can be done when the Node B needs to restrict transmission/reception of UEs. As illustrated in Table 1 below, the RNC allocates UE-IDs when needed according to the status of each Node B.

TABLE 1

| ID Type | Information | Description |
|---|---|---|
| Dedicated UE-ID | AG | Node B controls the data rate of particular UE |
| Common UE-ID | AG | Node B controls the data rates of all UEs or a UE group |

TABLE 1-continued

| ID Type | Information | Description |
|---|---|---|
| Common Control UE-ID | Common control information | Node B controls UEs with common control ID |

The common control information is not a scheduling grant for E-DCH transmission. It is used to control the operation of a UE according to the state of the Node B. For a 5-bit common control information field, the following control information can be defined.

TABLE 2

| Field Value | Name | Description |
|---|---|---|
| 00000 | ONLY_MINSET_ID | Decrease rates of all UEs to lowest rate |
| 00001 | REQ_NOT_ALLOWED | Do not request rate due to load in cell being too high |
| 00010 | DATA_RATE_SCALE_DOWN | Decrease rates of all UEs by one level |
| 00011 | DATA_RATE_SCALE_UP | Increase rates of all UEs by one level |
| 00100 | DATA_RATE_SCALE_TWO DOWN | Decrease rates of all UEs by two levels |
| 00101 | DATA_RATE_SCALE_TWO UP | Increase rates of all UEs by two levels |

Table 3 illustrates the structure of an AG delivered using a dedicated UE-ID.

TABLE 3

| Name | Description |
|---|---|
| E-TFI | Allocated rate |
| Validity duration_indicator | Indicates whether the AG is valid in a TTI of interest or until receiving the next AG |
| ALL_Process_indicator | Indicates whether the rate applies only to a TTI of interest or to entire HARQ process |

Table 4 illustrates the structure of an AG delivered using a common UE-ID.

TABLE 4

| Name | Description |
|---|---|
| E-TFI | Allocated rate |
| ALL_UE_indicator | Indicates whether AG applies to all UEs or only to some particular UEs |

Upon receipt of an AG having the configuration illustrated in Table 4, a UE operates according to the value of ALL_UE_indicator defined as

TABLE 5

| ALL_UE_indicator | Description |
|---|---|
| 0 | Applies rate only to UEs which did not transmit data in a previous TTI |
| 1 | Applies rate to all UEs having common UE-ID |

In every scheduling period, the Node B determines AGs and a signaling scheme for UEs that are communicating on the E-DCH. The signaling scheme is determined depending on system design and implementation. In one embodiment, the Node B selects a common signaling scheme to transmit an AG, if the number of UEs to which the same AG is applied in a cell is equal to or greater than a predetermined value. It can be further contemplated as another embodiment that the Node B allocates the same AG to a predetermined UE group and selects common signaling for the UE group and dedicated signaling for the remaining UEs.

UEs that report similar status information or that have the same QoS or the same service type can be grouped into one UE group. The Node B groups UEs according to a particular condition, determines an AG for the UE group, and transmits the AG to the UE group by common signaling. Once a signaling scheme is selected, the Node B transmits the AG together with a CRC masked with a dedicated or common UE-ID according to the selected signaling scheme.

Figure 4:
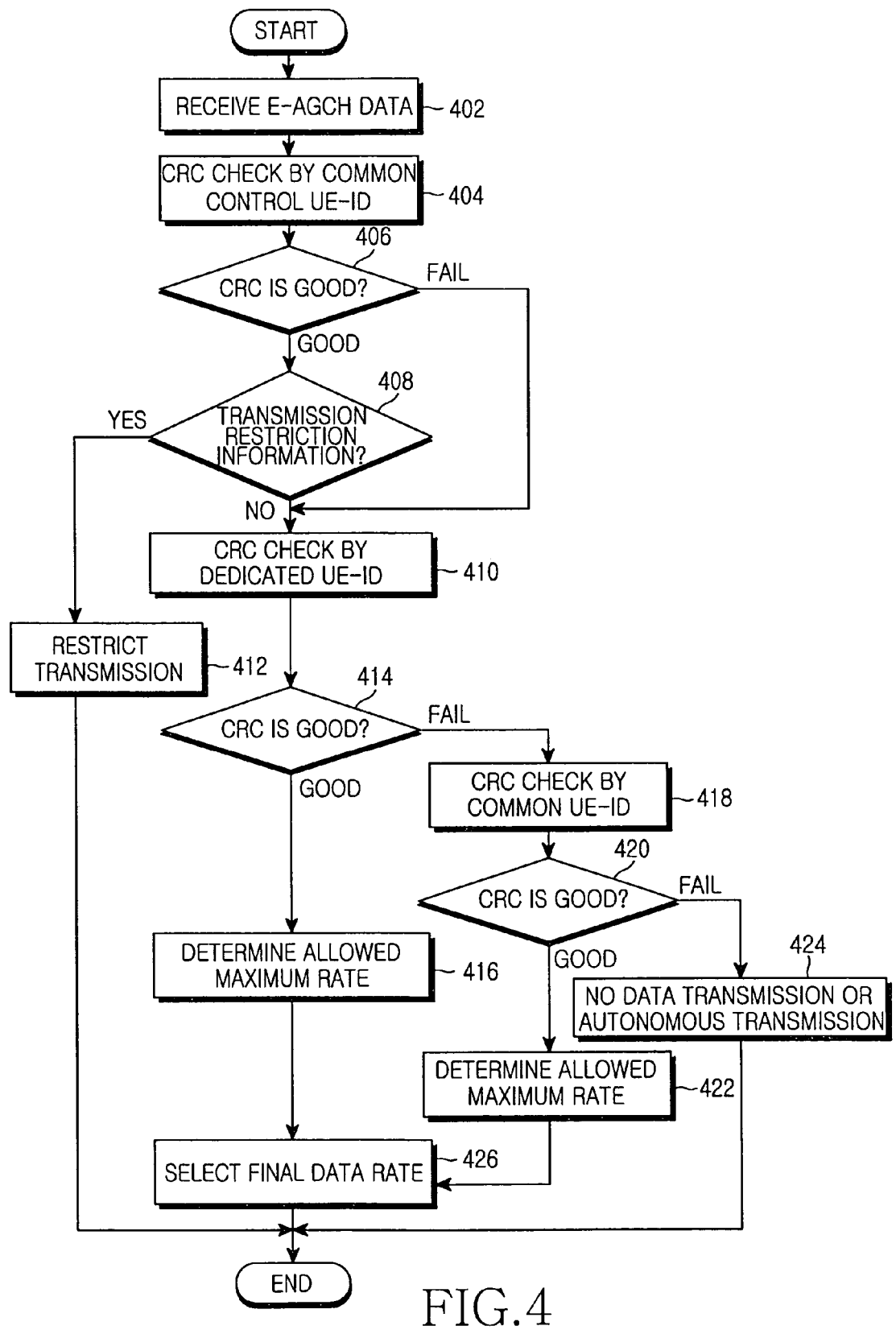
FIG. 4 is a flowchart illustrating a UE operation according to an embodiment of the present invention.

With reference to FIG. 4, a UE operation according to an embodiment of the present invention will be described.

FIG. 4 is a flowchart illustrating an operation of a UE having a common UE-ID, a dedicated UE-ID and a common control UE-ID. In the case where the Node B transmits AGs to the UE by the common and dedicated UE-IDs, and common control information to the UE by the common control UE-ID, the UE prioritizes the UE-IDs for signal reception. Since the Node B transmits common control information to control the transmission of the UE in an emergency state, the UE monitors whether common control information exists for the UE using the common control UE-ID.

Referring to FIG. 4, the UE receives E-AGCH data on an E-AGCH in step 402. The UE checks the CRC of the E-AGCH data using the common control UE-ID in step 404 and determines whether the CRC check has passed or failed in step 406. To describe it more specifically, the UE separates the E-AGCH data into signaling information and a masked CRC and acquires an original CRC by demasking the CRC with the common control UE-ID. Then the UE checks errors in the signaling information using the original CRC. If the CRC check has passed, which implies that the E-AGCH data contains common control information, the UE interprets the common control information in step 408.

If the common control information indicates a one-level rate-down or a rate-down to a minimum rate to restrict transmission, the UE limits its E-DCH data rate based on the common control information in step 412. Notably, the UE does not attempt to receive an AG by either the dedicated or common UE-ID. On the other hand, if the CTC check has failed in step 406, or if the common control information is not transmission restriction information (such as, being a rate request) in step 408, the UE checks the CRC of the E-AGCH data using the dedicated UE-ID in step 410.

In the presence of an AG delivered by the dedicated UE-ID as a result of the CRC check in step 414, the UE updates its allowed maximum data rate for the E-DCH to a data rate indicated by the AG in step 416 and selects a final E-DCH data rate within the updated allowed maximum data rate in step 426. The final data rate is determined within the allowed maximum data rate according to the amount of data to be transmitted and the status of the UE.

On the contrary, if the CRC check has failed in step 414, which implies the absence of an AG delivered using the dedicated UE-ID, the UE performs a CRC check on the E-AGCH data using the common UE-ID in step 418. If the CRC check has passed and thus an AG is acquired in step 420, the UE updates its allowed maximum data rate for the E-DCH to a data rate indicated by the AG in step 422 and selects a final E-DCH data rate within the updated allowed maximum data rate in step 426. The final data rate is determined within the allowed maximum data rate according to the amount of data to be transmitted and the status of the UE. Meanwhile, if the CRC check has failed in step 420, the UE does not transmit E-DCH data or operate in an autonomous transmission mode in step 424.

To describe step 422 in more detail, the UE reads ALL_UE_indicator set in the AG in step 422. If ALL_UE_indicator is 1, which implies that an allocated data rate applies to all UEs, the UE updates its allowed maximum data rate to the data rate indicated by the AG. If ALL_UE_indicator is 0, the UE checks whether it transmitted data in a previous TTI. Only if the UE did not transmit data in a previous TTI, it updates its allowed maximum data rate to the data rate indicated by an E-TFI set in the AG. While not shown, if the UE transmitted data before, it proceeds to step 424.

Figure 5:
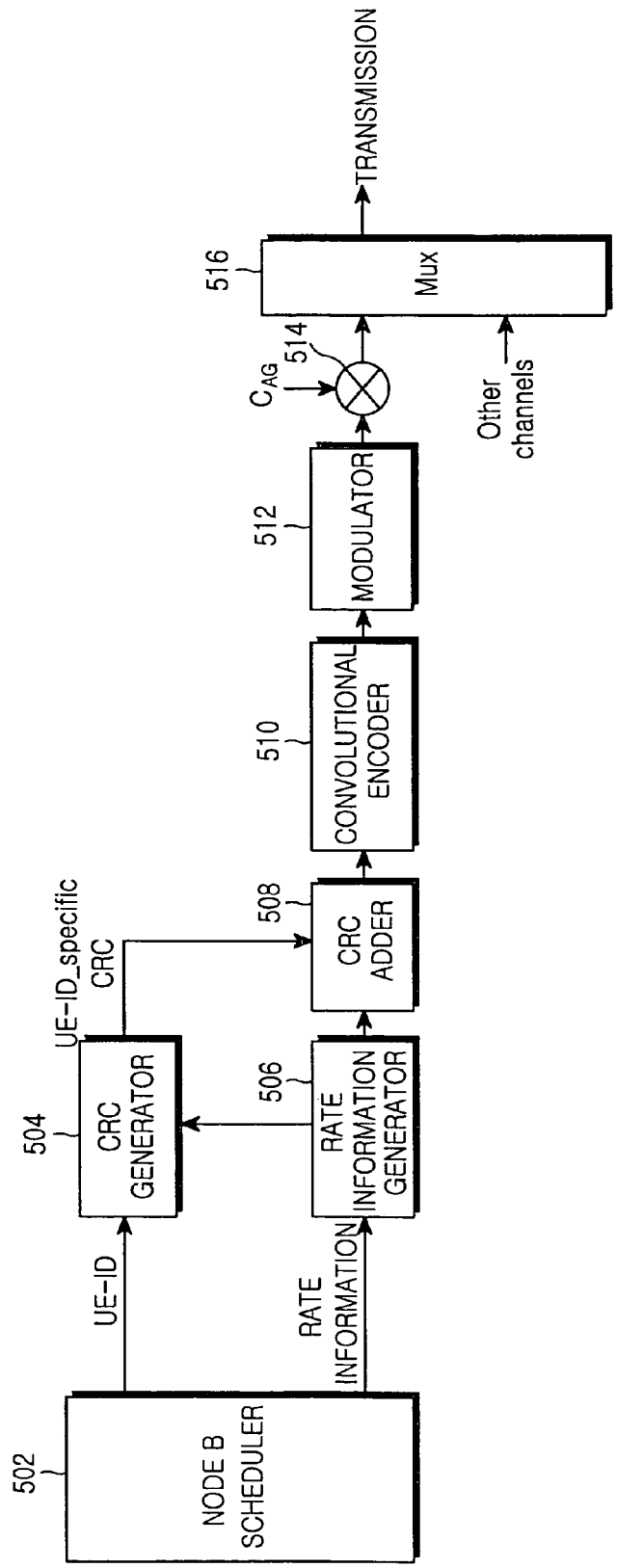
FIG. 5 is a block diagram of a transmitter in a Node B according to an embodiment of the present invention.

FIG. 5 is a block diagram of a transmitter for transmitting E-AGCH data in the Node B according to an embodiment of the present invention.

Referring to FIG. 5, a scheduler 502 preserves dedicated UE-IDs and common UE-IDs allocated by the RNC, for use in scheduling uplink data transmission. The scheduler 502 allocates an allowed maximum data rate to a UE that intends to perform an E-DCH service according to a report of the buffer status and power status of the UE and the ROT level of the cell, selects a signaling scheme according to the allowed maximum data rate, and provides a dedicated or common UE-ID to a CRC generator 504 according to the selected signaling scheme. For instance, if the number of UEs to which the same allowed maximum data rate is allocated is equal to or greater than a predetermined value, the scheduler 502 selects common signaling and provides a common UE-ID to the CRC generator 504. In another case, the scheduler 502 allocates the same data rate to a predetermined UE group and selects common signaling for the UE group.

A rate information generator 506 generates an AG according to the allowed maximum data rate and the CRC generator 504 generates a CRC masked with the dedicated or common UE-ID with respect to the AG. A CRC adder 508 adds the masked CRC to the AG. Since the masked CRC contains the UE-ID, it is called a UE-ID-specific CRC. To increase reliability, the masked CRC and the AG are encoded in an encoder 510 and modulated in a modulator 512. The modulated data is spread with an E-AGCH channelization code ($C_{AG}$) in a spreader 514. A multiplexer (MUX) 516 multiplexes the spread E-AGCH data with other spread channel data, prior to transmission.

Figure 6:
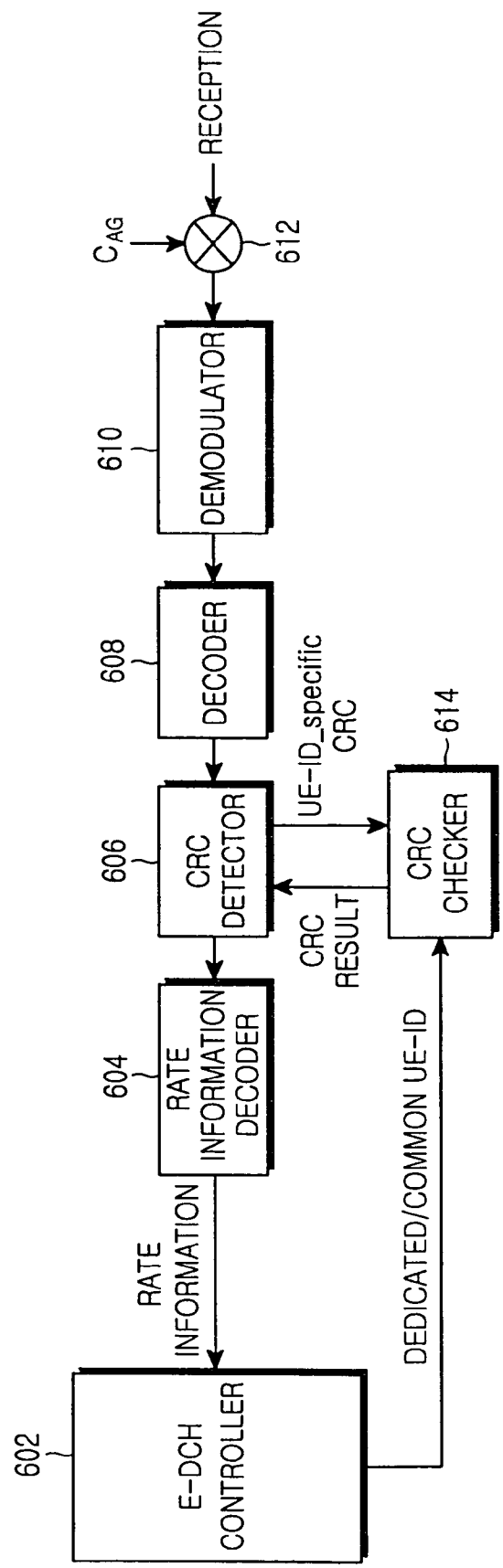
FIG. 6 is a block diagram of a receiver in a UE according to an embodiment of the present invention.

FIG. 6 is a block diagram of a receiver for receiving E-AGCH data in the UE according to an embodiment of the present invention. The illustrated receiver configuration is confined to reception of an AG except common control information.

Referring to FIG. 6, a received signal is despread with the E-AGCH channelization code $C_{AG}$ in a despreader 612, demodulated in a demodulator 610, and decoded in a decoder 608. A CRC detector 606 extracts a masked CRC from the decoded data. A CRC checker 614 receives both a dedicated UE-ID and a common UE-ID for the UE from an E-DCH controller 602. It performs a CRC check on the decoded data by first demasking the masked CRC using the dedicated UE-ID. If the CRC has failed, the CRC checker 614 performs a CRC check on the decoded data by demasking the masked CRC using the common UE-ID.

The CRC checker 614 provides the CRC results to the CRC detector 606. If at least one of the UE-IDs has passed in the CRC check, the CRC detector 606 provides an AG without the masked CRC in the decoded data to a rate information decider 604. If both the UE-IDs have failed in the CRC check, the CRC detector 606 discards the decoded data. The CRC detector 606 tells the rate information decider 604 whether the AG has been interpreted by the dedicated or common UE-ID. The rate information decider 604 updates the allowed maximum data rate of the UE using the AG depending on whether the AG has been interpreted by the dedicated or common UE-ID, and provides the updated allowed maximum data rate to the E-DCH controller 602, for E-DCH transmission.

Second Embodiment

In a system where the uplink data rates of UEs are controlled by RGs indicating UP, DOWN or KEEP, an RNC allocates common codes and dedicated codes to the UEs and a Node B transmits the RGs to the UEs by the dedicated or common codes.

The RNC sets both common and dedicated codes for UEs by upper layer signaling in allocating orthogonal codes to the UEs, for RG reception. Here, the RNC sets one common code for all UEs in each cell or for a UE group classified by service type. The UEs basically have dedicated codes. UEs that report similar status information, have the same QoS, or have the same service type can be grouped into one UE group.

In every scheduling period, the Node B determines RGs and signaling schemes for UEs that are communicating for an E-DCH service. The signaling schemes are decided depending on system design and implementation. The Node B selects common signaling for most RGs indicating UP, DOWN or KEEP in one embodiment. In another embodiment, the Node B selects common signaling to increase or decrease the data rates of a predetermined UE group in the cell and dedicated signaling for the remaining UEs. The Node B then spreads RGs with orthogonal codes according to the selected signaling scheme.

Figure 7:
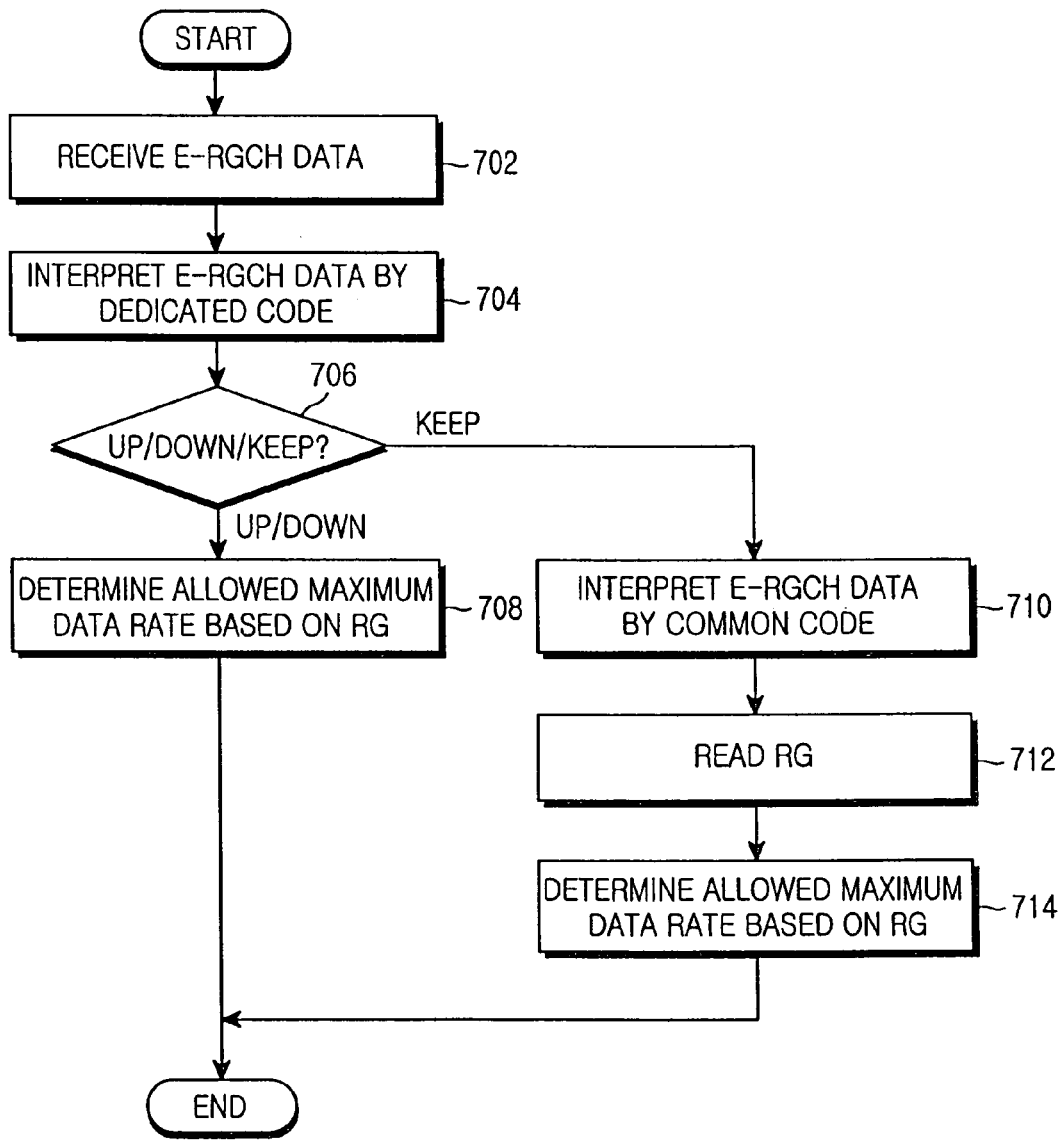
FIG. 7 is a flowchart illustrating a UE operation according to another embodiment of the present invention.

FIG. 7 is a flowchart illustrating a UE operation according to another embodiment of the present invention. The UE is allocated both dedicated and common codes.

Referring to FIG. 7, the UE receives Enhanced uplink dedicated channel Relative Grant CHannel (E-RGCH) data containing an RG spread with an orthogonal code every scheduling period in step 702. In step 704, the UE acquires the RG by interpreting the E-RGCH data first with the dedicated code. The UE then reads the RG in step 706. The RG has the following values listed in Table 6 below.

TABLE 6

| Value | Conventional | An Embodiment of Present Invention |
|---|---|---|
| +1 | UP | UP |
| 0 | KEEP | Common signaling information |
| −1 | DOWN | DOWN |

If the RG is +1 or −1 in step 706, the UE increase or decreases an allowed maximum data rate for the E-DCH by a predetermined level in step 708. If the RG is 0, the UE acquires an RG by interpreting the E-RGCH data using the common code in step 710 and reads the RG in step 712. In step 714, the UE increases, decreases or maintains the allowed maximum data rate for the E-DCH. If the RG is +1, the allowed maximum data rate is increased, if the RG is −1, it is decreased, and if the RG is 0, it is not changed.

Figure 8:
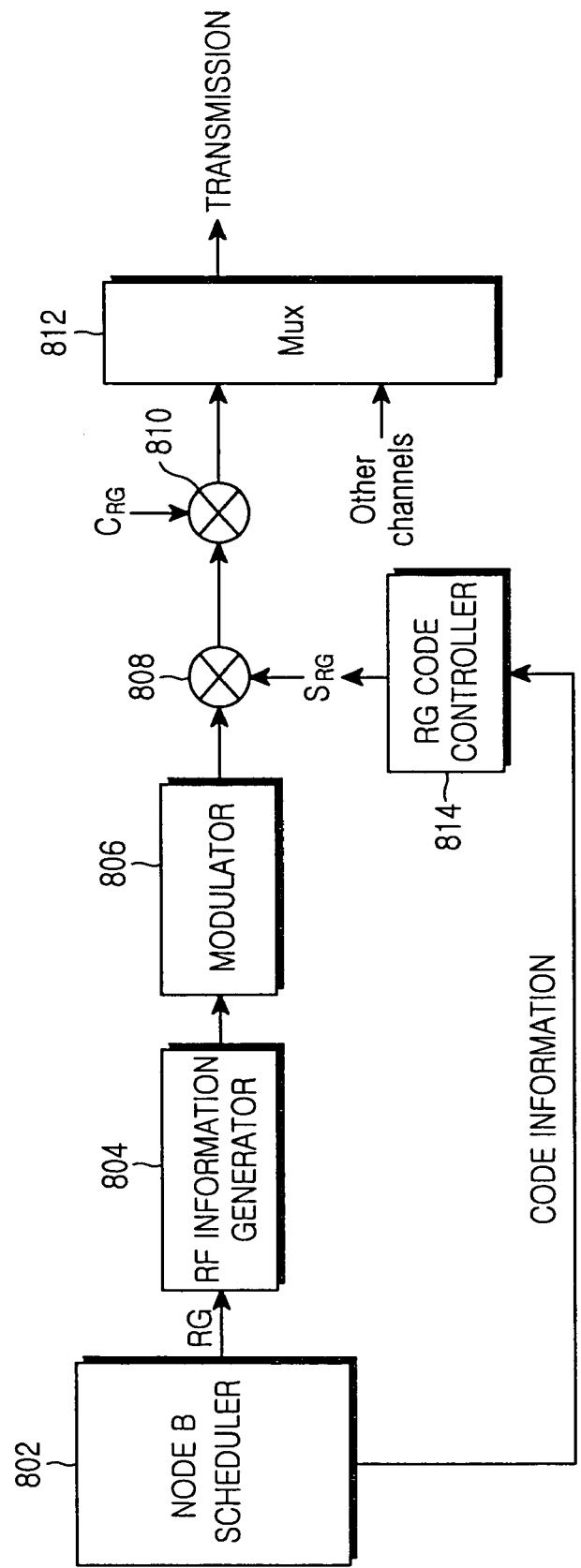
FIG. 8 is a block diagram of a transmitter in a Node B according to a second embodiment of the present invention.

FIG. 8 is a block diagram of a transmitter for transmitting E-RGCH data in the Node B according to the second embodiment of the present invention.

Referring to FIG. 8, a scheduler 802 allocates an allowed maximum data rate to a UE that intends to perform an E-DCH service according to a report of the buffer status and power status of the UE and the ROT level of the cell. A signaling scheme is selected according to the allowed maximum data rate. An RG generator 804 generates an RG set to +1, 0 or −1 by comparing the allocated allowed maximum data rate with the current allowed maximum data rate of the UE. A modulator 806 modulates the RG. Meanwhile, an RG code controller 814 selects an orthogonal code by which to transmit the RG according to the selected signaling scheme. The orthogonal code is a common code in common signaling and a dedicated code in dedicated signaling.

A multiplier 808 multiplies the modulated RF by the selected orthogonal code ($S_{RG}$). A spreader 810 spreads the product with an E-RGCH channelization code CRG, thereby creating E-RGCH data. A MUX 812 multiplexes the E-RGCH data with other spread channel data, prior to transmission.

Figure 9:
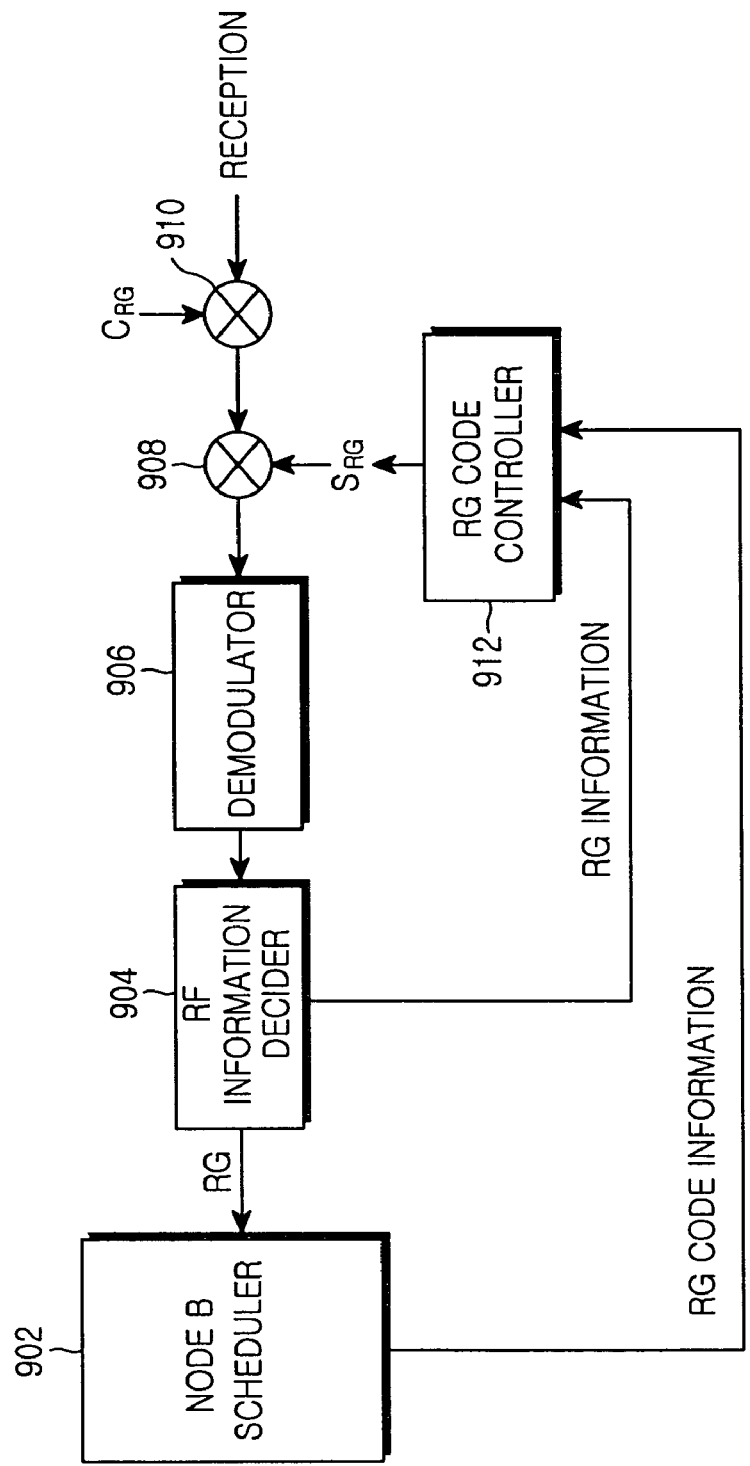
FIG. 9 is a block diagram of a receiver in a UE according to a second embodiment of the present invention.

FIG. 9 is a block diagram of a receiver for receiving E-RGCH data in the UE according to the second embodiment of the present invention.

Referring to FIG. 9, a received signal is despread with the E-RGCH channelization code ($C_{RG}$) in a despreader 910, multiplied by the orthogonal code $S_{RG}$ in a multiplier 908, and demodulated in a demodulator 906. An RG code controller 912 receives both a dedicated and common code of the UE from an E-DCH controller 902. It first provides the dedicated code to the multiplier 908 every scheduling period. Unless an RG interpreted by the dedicated code is "KEEP", the RG code controller 912 provides the common code to the multiplier 908.

An RG information decider 904 determines whether the RG interpreted by the dedicated code is 0 (KEEP). If the RG is not 0, the RG information decider 904 provides a rate-up or rate-down command based on the RG to the E-DCH controller 902. The E-DCH controller 902 increase or decreases the current allowed maximum data rate according to the command and selects an E-DCH data rate within the changed allowed maximum data rate.

If the RG has been interpreted by the dedicated code and indicates "KEEP", the RG information decider 904 requests the RG code controller 912 to set the common code. The RG code controller 912 correspondingly sets the common code for the multiplier 908. The multiplier 908 again multiplies the same E-RGCH data by the common code and the demodulator 906 demodulates the product. Thus, the resulting new RG is provided to the RG information decider 904 and the E-DCH controller 902 increases, maintains or decreases the current allowed maximum data rate according to a decision made on the new RG by the RG information decider 904.

Third Embodiment

A third embodiment of the present invention is characterized by the use of an indicator indicating a scheduling grant or common control information so that a UE operating in accordance with the first embodiment of the present invention does not need to distinguish the scheduling grant from the common control information by performing a CRC check on an E-SGCH designed for delivering a scheduling grant.

In the first embodiment of the present invention, the UE uses numerous UE-IDs including dedicated and common UE-IDs in CRC checks. This may bring about reception complexity to the UE which must read a scheduling grant in every TTI. To overcome the shortcoming, an indicator indicating a scheduling grant or common control information is inserted into the header of E-SGCH data, thereby mitigating the CRC check constraint in the third embodiment of the present invention.

Figure 10:
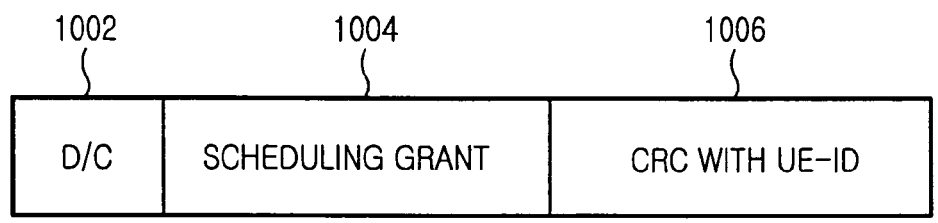
FIG. 10 illustrates the data format of an Enhanced Scheduling Grant CHannel (E-SGCH) for carrying downlink signaling information according to a third embodiment of the present invention.
Figure 10:
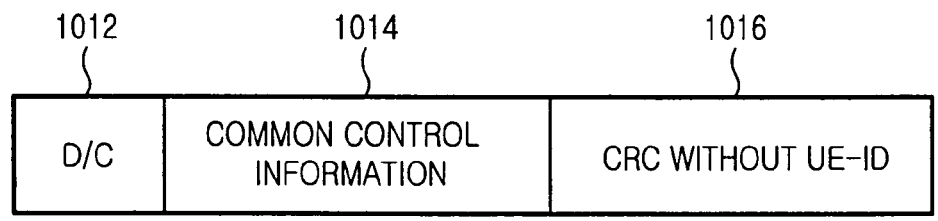

With reference to FIG. 10, the structure of E-SGCH data according to the third embodiment of the present invention will be described in great detail.

Referring to FIG. 10, reference numeral 1000 denotes data including a scheduling grant (hereinafter, referred to as scheduling data) and reference numeral 1100 denotes data including common control information (hereinafter, referred to as common control data). The scheduling data 1000 includes a dedicated or common indicator (D/C) 1002, a scheduling grant 1004, and a CRC with UE-ID 1006. The common control data 1100 includes a D/C 1012, common control information 1014, and a CRC without UE-ID 1016.

The D/Cs 1002 and 1012 indicate whether the following data is a scheduling grant or common control information. For example, if a D/C is 0, it indicates common control information, and if the D/C is 1, it indicates a scheduling grant. The CRC with UE-ID 1006 is a CRC masked with a dedicated or common UE-ID. The common control information 1014 is used for the Node B to control the operation of the UE. The CRC without UE-ID 1016 is an ordinary CRC masked with no UE-ID.

In accordance with the third embodiment of the present invention, the UE determines by the D/C of received E-SGCH data whether the scheduling grant 1004 or the common control information 1014 follows the D/C. If the D/C indicates a scheduling grant 1004, the UE performs a CRC check on the scheduling grant 1004 using the CRC with UE-ID 1006. The CRC check is done first using a dedicated UE-ID and then using a common UE-ID. If the D/C indicates common control information 1014, the UE performs a CRC check on the common control information 1014 using the CRC without UE-ID 1016. In this way, the D/C is interpreted before a CRC check.

The UE then determines an allowed maximum data rate for the E-DCH by interpreting the scheduling grant, or interpreting the common control information.

Fourth Embodiment

In a system where the uplink data rate of a UE is controlled by Node B-controlled scheduling, if a channel for delivering an AG and a channel for delivering an RG are simultaneously established to indicate an E-DCH rate, a scheduler transmits the AG to rapidly increase/decrease the data rate by two or more levels or transmits the RG to increase/decrease the data rate by one level or maintain the data rate.

The system allocates both dedicated and common UE-IDs to each UE. A Node B transmits an AG using the dedicated or common UE-ID to the UE, when needed.

An AG delivered by a dedicated UE-ID is constructed in the same format illustrated in Table 3 as in the first embodiment of the present invention. Yet, an AG delivered using a common UE-ID is configured to include an indicator indicating whether an allowed maximum data rate is changed to a data rate indicated by an E-TFI stepwise or at one time.

Table 7 below illustrates the format of the AG delivered using the common UE-ID.

TABLE 7

| Name | Description |
| --- | --- |
| E-TFI | Allocated rate |
| ALL_UE_indicator | Indicates whether AG applies to all UEs or only to some particular UEs. |
| Ramping_indicator | Indicates whether to increase to the allocated rate at one time and receive RG or to increase to the allocated rate gradually and not receive RG. |

ALL_UE_indicator is defined as

TABLE 8

| ALL_UE_indicator | Description |
| --- | --- |
| 0 | Applies rate only to UEs which did not transmit data in a previous TTI |
| 1 | Applies rate to all UEs having common UE-ID |

Ramping_indicator is defined as

TABLE 9

| Ramping_indicator | Description |
| --- | --- |
| 0 | increase to the allocated rate at one time and receive RG. |
| 1 | increase to the allocated rate gradually and not receive RG. |

Upon receipt of an AG using the dedicated UE-ID, the UE operates in the same manner as in the first embodiment of the present invention. On the other hand, if it receives an AG using the common UE-ID, the UE changes its allowed maximum data rate to a data rate indicated by E-TFI stepwise or at one time according to Ramping_indicator. The E-TFI is applied only when data was not transmitted before or all the time according to ALL_UE_indicator.

Severe interference may be created in the case where a plurality of UEs increase their allowed maximum data rates to target rates indicated by received AGs at one time. Thus UEs, receiving AGs by common UE-IDs, change their allowed maximum data rates to a target rate over a plurality of TTIs according to the Ramping_indicator. However, if an AG received using a common UE-ID indicates a target rate lower than a current allowed maximum data rate, a corresponding UE decreases the allowed maximum data rate to the target rate at one time.

In the case of a gradual increase to a target rate according to an AG received using a common UE-ID, an RG is meaningless. Therefore, the UE either does not receive an RG or discards a received RG. In the case of receiving an AG using a dedicated UE-ID, the UE increases its allowed maximum data rate to a target rate at one time and then updates the allowed maximum data rate according to an RG received in the next TTI.

For better understanding of the fourth embodiment of the present invention, a required AG structure and associated operations of a Node B and a UE will be described.

E-AGCH data containing an AG has the configuration illustrated in FIG. 3. The preceding AG 302 indicates an absolute value of an allocated allowed maximum data rate and the following CRC with UE-ID 304 is used to identify a UE for which the AG 302 transmitted on a common channel is destined for a CRC check. Basically, the UE checks errors in the AG 302 using the CRC 304. Since the CRC 304 is masked with a UE-ID, a CRC check by a different UE-ID results in errors. Hence, only the UE having the right UE-ID acquires the AG 302.

The E-AGCH can be configured in two ways to deliver an AG to a UE. The E-AGCH is configured in the above manner, that is, to have a CRC masked with a UE-ID. Thus, the UE performs a CRC check using the CRC. Alternatively, the E-AGCH is configured to have a common CRC and a UE-ID inserted in E-AGCH data. After acquiring error-free E-AGCH data by a CRC check, the UE reads the E-AGCH data and checks a UE-ID.

As described above, the RNC allocates both dedicated and common UE-IDs to each UE that want to establish an E-DCH by upper layer signaling, with the aim to use common signaling and dedicated signaling in combination. Besides the common and dedicated UE-IDs for scheduling, a common control UE-ID can be additionally allocated to deliver common control information by which the Node B restricts the transmission/reception of the UE.

The RNC sets the same common UE-ID for all UEs in each cell or for a UE group classified by service type. UEs that report similar status information, have the same QoS, or have the same service type can be grouped into one UE group.

In every scheduling period, a Node B scheduler determines an AG and a signaling scheme for each UE. The signaling scheme is determined depending on system design and implementation. In one embodiment, the Node B selects common signaling to transmit an AG, if the number of UEs to which the same AG is applied in a cell is equal to or greater than a predetermined value. It can be further contemplated as another embodiment that the Node B allocates the same AG to a predetermined UE group and decides to transmit the AG to the UE group by a common UE-ID. If the load of a cell is small and a small number of UEs are scheduled, the Node B may transmit an AG to all the UEs within the cell by a common UE-ID. Once an AG and a signaling scheme are determined, the Node B transmits the AG together with a CRC masked with a dedicated or common UE-ID to the UE.

Figure 11:
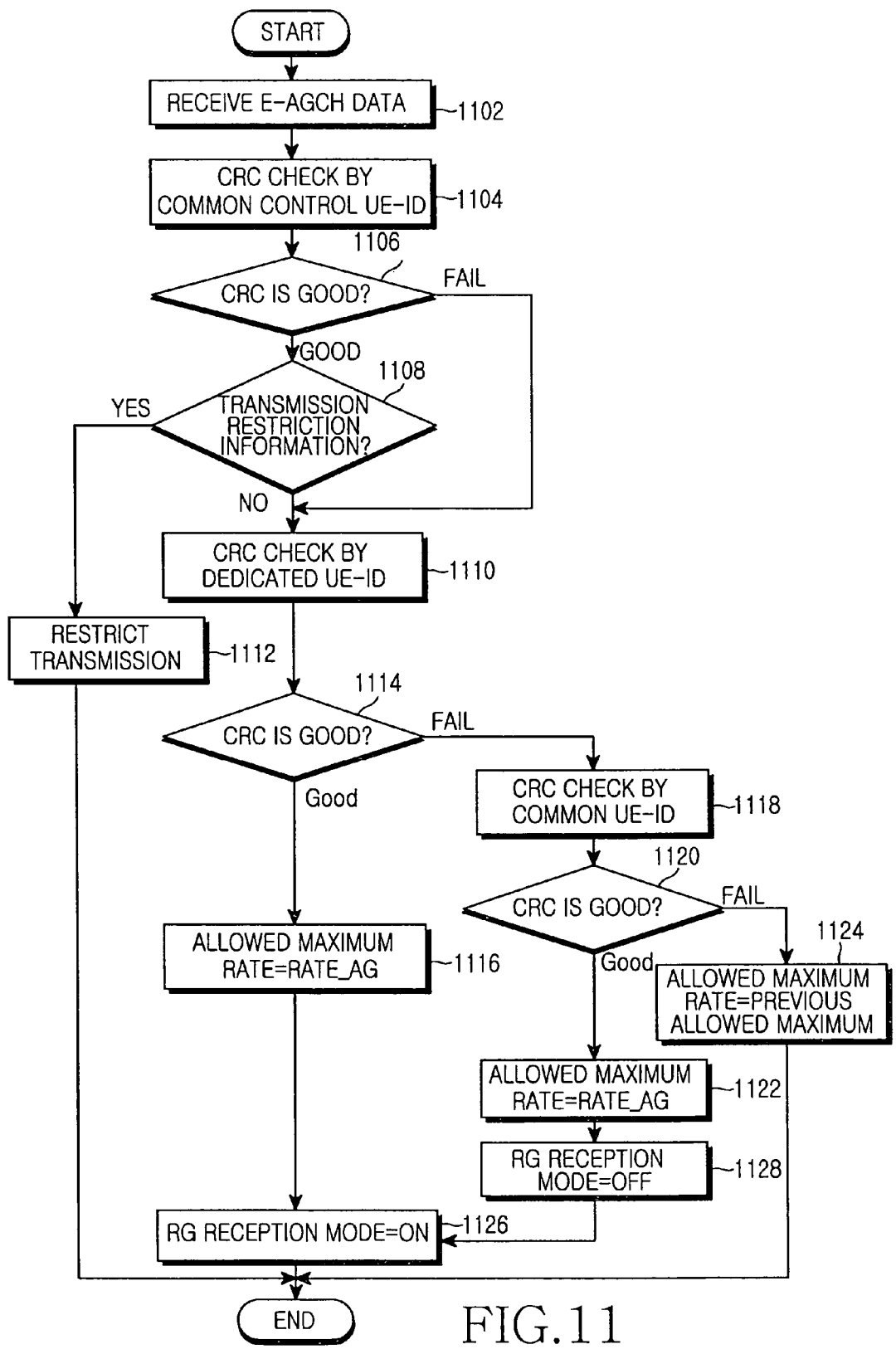
FIG. 11 is a flowchart illustrating a UE operation according to a fourth embodiment of the present invention.

FIG. 11 is a flowchart illustrating a UE operation according to a fourth embodiment of the present invention.

Referring to FIG. 11, the UE receives E-AGCH data every scheduling period in step 1102. The UE performs a CRC check on the E-AGCH data first using a common control UE-ID in step 1104 and determines whether the CRC check has passed in step 1106. If the CRC check is good, this implies that the E-AGCH data contains common control information. Thus, the UE interprets the common control information in step 1108.

If the common control information is transmission restriction information indicating a one-level rate-down or a change to a minimum rate, the UE restricts an E-DCH data rate according to the common control information in step 1112. In this case, the UE does not attempt to receive an AG by a dedicated UE-ID or a common UE-ID. However, if the CRC check has failed in step 1106 or if the common control information is not related to transmission restriction, for example, it is a rate request in step 1108, the UE performs a CRC check on the E-AGCH data using the dedicated UE-ID in step 1110.

If determining that an AG transmitted using the dedicated UE-ID exists as a result of the CRC check in step 1114, the UE updates its allowed maximum data rate for the E-DCH to a data rate indicated by the AG in step 1116 and sets an RG reception mode to ON to receive an RG in the next TTI in step 1126. On the contrary, if the CRC check has failed, that is, the AG transmitted by the dedicated UE-ID is not present in step 1114, the UE performs a CRC check on the E-AGCH data using the common UE-ID in step 1118. When the CRC check is good and thus an AG is acquired in step 1120, the UE updates the allowed maximum data rate according to the AG in step 1122 and sets an RG reception mode to OFF not to receive an RG in the next TTI in step 1128.

To describe step 1122 in great detail, the UE reads ALL_UE_indicator included in the AG in step 1122. If ALL_UE_indicator is 1, this implies that the AG applies to all UEs. Thus, the UE updates the allowed maximum data rate to the data rate indicated by the AG (referred to as RATE_AG) and proceeds to step 1128. On the other hand, ALL_UE_indicator is 0, the UE determines whether it transmitted data in a previous TTI. If the UE did not transmit data in a previous TTI, it updates the allowed maximum data rate to RATE_AG and proceeds to step 1128. While not shown, if the UE transmitted data in a previous TTI, it maintains the previous allowed maximum data rate.

If the allowed maximum data rate is increased in step 1122, the UE reads Ramping_indicator included in the AG. If Ramping_indicator is 0, the UE increases the allowed maximum data rate at one time to the data rate indicated by E-TFI included in the AG. If Ramping_indicator is 1, the UE increases the allowed maximum data rate stepwise to the indicated data rate.

Meanwhile, if the CRC check has failed in step 1120, this implies that the AG based on the common UE-ID was not transmitted. Thus the UE maintains the previous allowed maximum data rate in step 1124. In this case, no AGs have been received and thus the UE receives an RG for rate determination.

Figure 12:
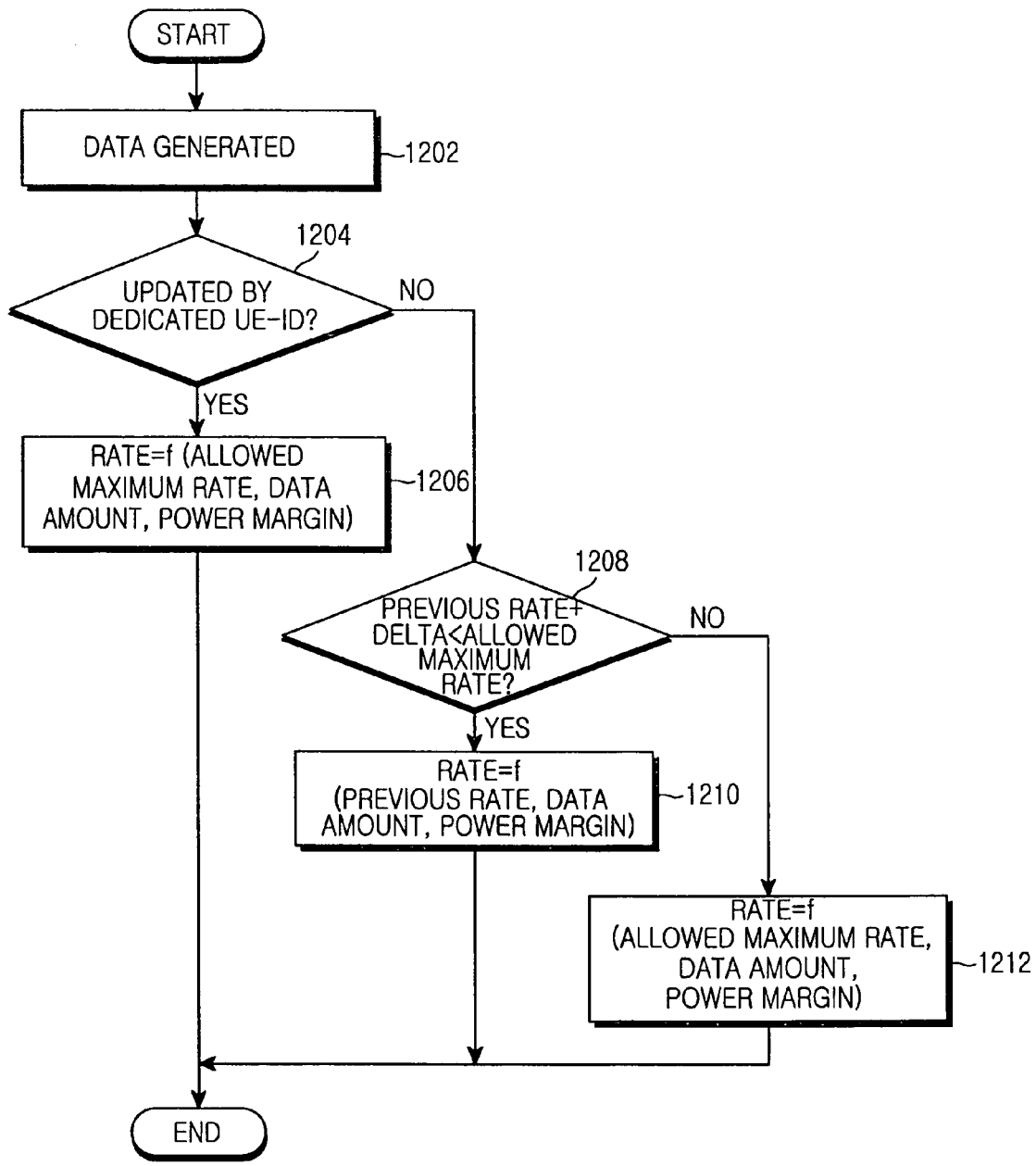
FIG. 12 is a flowchart illustrating an operation for determining an uplink data rate in a UE according to the fourth embodiment of the present invention.

With reference to FIG. 12, a description will be made of a method of determining an actual uplink data rate in the UE after updating its allowed maximum data rate in the procedure illustrated in FIG. 11.

Referring to FIG. 12, upon generation of E-DCH data to be transmitted in step 1202, the UE determines whether the current allowed maximum data rate was updated using the dedicated or common UE-ID in step 1204. If the current allowed maximum data rate was updated using the dedicated UE-ID, the UE selects a final data rate within the updated allowed maximum data rate based on the amount of data to be transmitted and the status information of the UE. If a large amount of data is to be transmitted and sufficient transmit power is available, the UE can transmit the data at the allowed maximum data rate.

While not shown, if the current allowed maximum data rate was updated using the common UE-ID, the UE reads Ramping_indicator in an AG using the common UE-ID. If Ramping_indicator is 0, the UE goes to step 1206. If Ramping_indicator is 1, the UE changes the previous data rate by a predetermined value, delta and compares the changed data rate with the current allowed maximum data rate in step 1208. The value, delta is a maximum rate increment/decrement available in one TTI, set by upper signaling or predetermined. If the changed data rate is lower than the allowed maximum data rate, the UE selects a final data rate within the changed data rate based on the amount of data to be transmitted and the UE status information (such as a power margin) in step 1210. If the changed data rate is equal to or higher than the allowed maximum data rate, the UE selects a final data rate within the allowed maximum data rate based on the amount of data to be transmitted and the UE status information (such as a power margin) in step 1212.

A Node B transmitter for transmitting an AG and a UE receiver for receiving the AG are identical in configuration and operation to their counterparts that operate according to the first embodiment of the present invention. Thus, they will not be described redundantly herein.

Fifth Embodiment

In a system that controls the uplink data rate of a UE by Node B-controlled scheduling, the UE has a fast ramping UE-ID and a slow ramping UE-ID to receive an AG. The fast and slow ramping UE-IDs are transmitted by dedicated or common signaling. The UE may have an additional common control UE-ID. A Node B simultaneously establishes a channel for delivering an AG and a channel for delivering an RG, for scheduling of uplink packet data transmission.

Upon receipt of an AG by the fast ramping UE-ID, the UE increases its allowed maximum data rate to a target rate at one time and receives an RG. Upon receipt of an AG by the slow ramping UE-ID, the UE increases its allowed maximum data rate to a target rate stepwise and does not receive an RG. Because of the stepwise rate increase, the RG is meaningless to the UE. Therefore, when receiving the AG by the slow ramping UE-ID, the UE neither receives an RG nor discards a received RG. On the other hand, when receiving the AG by the fast ramping UT-ID, the UE increases the allowed maximum data rate to the target rate and then receives an RG in the next TTI, for E-DCH transmission.

At the start of E-DCH communications from the UE, the RNC allocates both a fast ramping UE-ID and a slow ramping UE-ID to the UE by upper layer signaling, taking into account many factors including Node B-controlled scheduling and the E-DCH service type of the UE. The UE-ID allocation can be considered in the following ways:

(1) The RNC allocates a fast ramping UE-ID to each UE and a slow ramping UE-ID to each UE group. In this case, the Node B and the UE operate in the same manner as in the fourth embodiment of the present invention.

(2) The RNC allocates a fast ramping UE-ID and a slow ramping UE-ID to each UE group.

(3) The RNC allocates a fast ramping UE-ID and a slow ramping UE-ID to each UE.

(4) The RNC allocates a fast ramping UE-ID to each UE group and a slow ramping UE-ID to each UE. UEs which report similar UE status information, have the same QoS, or the same service type are grouped into one UE group.

Table 10 below illustrates UE-IDs used in the fifth embodiment of the present invention.

TABLE 10

| ID Type | Information included in E-AGCH | Description |
|---|---|---|
| Fast ramping UE-ID | AG | Increase allowed maximum data rate to target rate at one time receive an RG |
| Slow ramping UE-ID | AG | Increase allowed maximum data rate to target rate stepwise does not receive an RG |
| Common Control UE-ID | Common control information | Node B controls UEs with common control ID |

Figure 13:
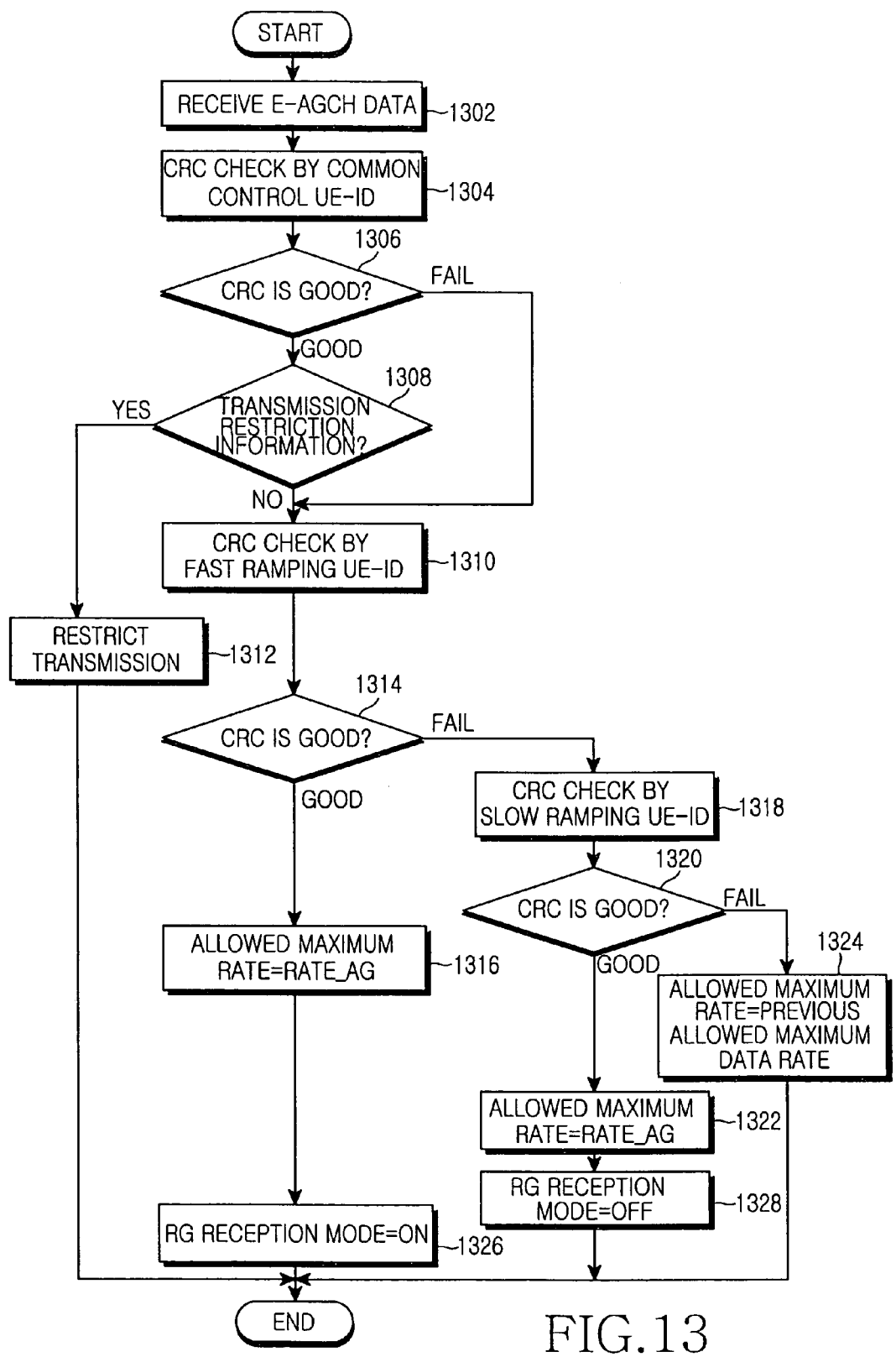
FIG. 13 is a flowchart illustrating an operation for determining an uplink data rate in a UE according to a fifth embodiment of the present invention.

FIG. 13 is a flowchart illustrating a UE operation according to the fifth embodiment of the present invention. The UE has all of a fast ramping UE-ID, a slow ramping UE-ID, and a common control UE-ID and operates depending on the UE-ID type of a received AG.

Referring to FIG. 13, the UE receives E-AGCH data every scheduling period in step 1302. The UE performs a CRC check on the E-AGCH data first using a common control UE-ID in step 1304 and determines whether the CRC check has passed in step 1306. If the CRC check is good, this implies that the E-AGCH data contains common control information. Thus, the UE interprets the common control information in step 1308.

If the common control information is transmission restriction information indicating a one-level rate-down or a change to a minimum rate, the UE restricts an E-DCH data rate according to the common control information in step 1312. In this case, the UE does not attempt to receive an AG by the fast or slow ramping UE-ID. However, if the CRC check has failed in step 1306 or if the common control information is not related to transmission restriction, for example, it is a rate request in step 1308, the UE performs a CRC check on the E-AGCH data using the fast ramping UE-ID in step 1310.

If determining that an AG transmitted using the fast ramping UE-ID exists as a result of the CRC check in step 1314, the UE updates its allowed maximum data rate for the E-DCH to a data rate indicated by the AG in step 1316 and sets an RG reception mode to ON to receive an RG in the next TTI in step 1326. On the contrary, if the CRC check has failed, that is, the AG transmitted by the dedicated UE-ID is not present in step 1314, the UE performs a CRC check on the E-AGCH data using the slow ramping UE-ID in step 1318.

When the CRC check is good and thus an AG is acquired in step 1320, the UE updates the allowed maximum data rate according to the AG in step 1322 and sets an RG reception mode to OFF not to receive an RG in the next TTI or to ignore a received RG in the next TTI in step 1328. Meanwhile, if the CRC check has failed in step 1320, this implies that the AG based on the slow ramping UE-ID was not transmitted. Thus the UE maintains the previous allowed maximum data rate in step 1324. In this case, no AGs have been received and thus the UE receives an RG for rate determination.

After setting the allowed maximum data rate in the above procedure, the UE selects a final data rate for actual data transmission in the procedure illustrated in FIG. 12.

In accordance with the fifth embodiment of the present invention, the Node B is configured and operates similarly to in the first embodiment of the present invention. With reference to FIG. 5, the operation of the Node B according to the fifth embodiment of the present invention will be described below.

Referring to FIG. 5, the Node B scheduler 502 preserves fast ramping UE-IDs and slow ramping UE-IDs allocated by the RNC, for use in scheduling uplink data transmission. The scheduler 502 allocates an allowed maximum data rate to a UE that intends to perform an E-DCH service according to a report of the buffer status and power status of the UE and the ROT level of the cell. The scheduler 502 further determines a UE-ID by which to notify the UE of the allowed maximum data rate. To allow the UE to receive an RG, the scheduler 502 provides a fast ramping UE-ID to the CRC generator 504. To prevent the UE from receiving an RG, the scheduler 502 provides a slow ramping UE-ID to the CRC generator 504. Based on any other criterion, the scheduler 502 can select the fast or slow ramping UE-ID.

The rate information generator 506 generates an AG according to the allowed maximum data rate and the CRC generator 504 generates a CRC masked with the fast or slow ramping UE-ID with respect to the AG. The CRC adder 508 adds the masked CRC to the AG. Since the masked CRC contains the UE-ID, it is called a UE-ID-specific CRC. The masked CRC and the AG are encoded in the encoder 510 and modulated in the modulator 512. The modulated data is spread with an E-AGCH channelization code CAG in the spreader 514. The MUX 516 multiplexes the spread E-AGCH data with other spread channel data, prior to transmission.

While not shown, the Node B generates an RG indicating a change in the allowed maximum data rate decided by the Node B scheduler 502, modulates the RG, and transmits the RG using an orthogonal code allocated to the UE and an E-RGCH channelization code.

Figure 14:
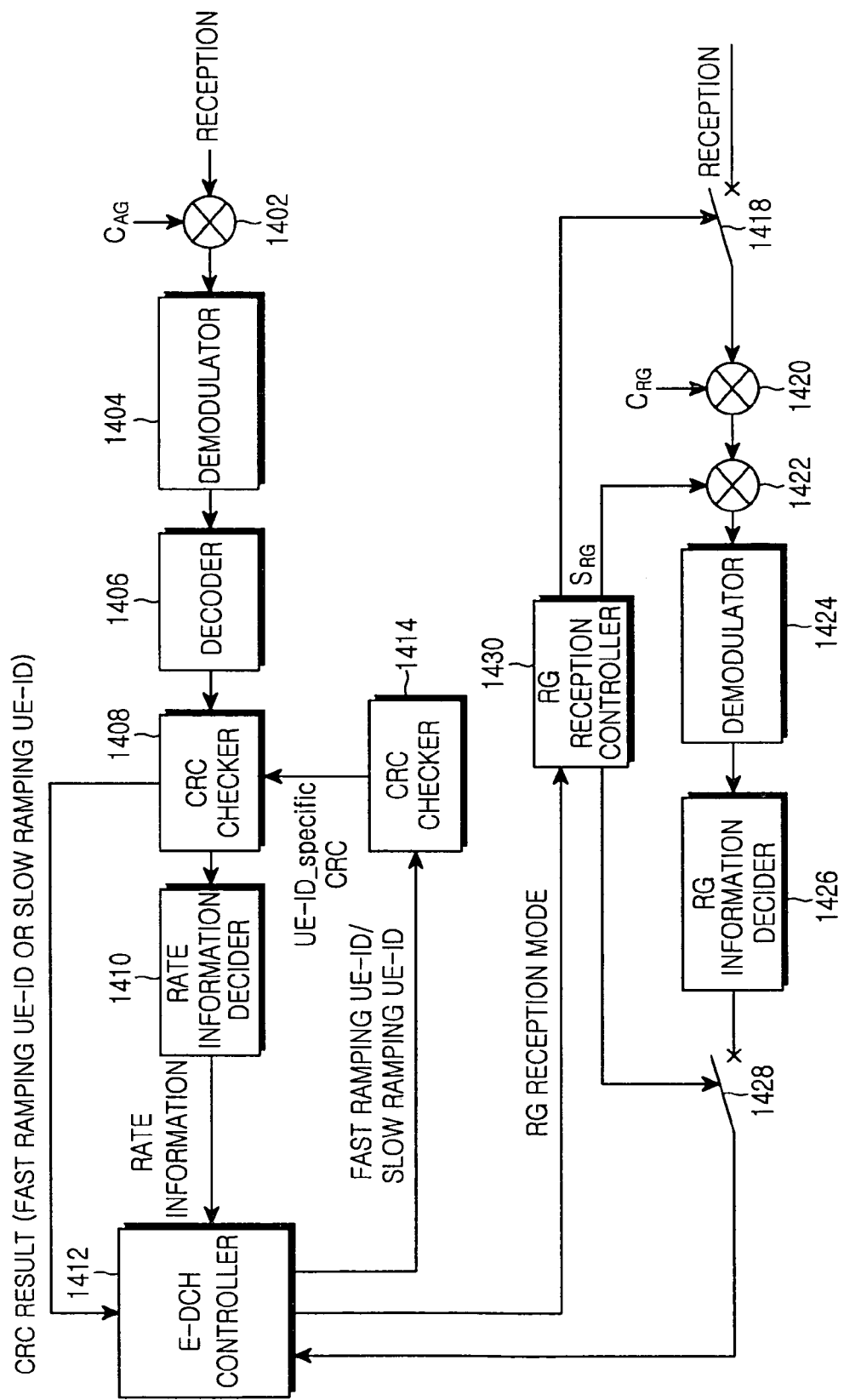
FIG. 14 is a block diagram of a receiver in the UE according to the fifth embodiment of the present invention.

FIG. 14 is a block diagram of a receiver for receiving E-AGCH data and E-RGCH data in the UE according to the fifth embodiment of the present invention. A configuration for receiving common control information by a common control UE-ID is excluded from the illustrated receiver configuration.

Referring to FIG. 14, a received signal is despread with the E-AGCH channelization code CAG in a despreader 1412, demodulated in a demodulator 1404, and decoded in a decoder 1406. A CRC detector 1408 extracts a masked CRC from the decoded data. An E-DCH controller 1412 manages a fast ramping UE-ID and a slow ramping UE-ID allocated by the RNC for scheduling of uplink data transmission. A CRC checker 1414 receives both the fast and slow ramping UE-IDs from the E-DCH 1412 and first performs a CRC check on the decoded data by demasking the masked CRC using the fast ramping UE-ID. If the CRC has failed, the CRC checker 1414 performs a CRC check on the decoded data by demasking the masked CRC using the slow ramping UE-ID.

The CRC checker 1414 provides the CRC results to the CRC detector 1408. If at least one of the UE-IDs has passed in the CRC check, the CRC detector 1414 provides an AG without the masked CRC in the decoded data to a rate information decider 1410. If both the UE-IDs have failed in the CRC check, the CRC detector 1414 discards the decoded data. The CRC detector 1408 provides the rate information decider 1410 with ID information indicating whether the AG has been interpreted by the fast or slow ramping UE-ID. The rate information decider 1410 updates the allowed maximum data rate of the UE using the AG according to the ID information, and provides the updated allowed maximum data rate to the E-DCH controller 1412, for E-DCH transmission.

Meanwhile, the ID information is also provided to the E-DCH controller 1412. The E-DCH controller 1412 determines whether to receive an RG depending on the ID information. If the received AG is associated with the fast ramping UE-ID, the E-DCH controller 1412 sets an RG reception mode to ON. If the received AG is associated with the slow ramping UE-ID, the E-DCH controller 1412 sets the RG reception mode to OFF. The RG reception mode is notified to an RG reception controller 1430.

The RG reception controller 1430 controls a first RG reception switch 1418 according to the RG reception mode. The first RG reception switch 1418 provides a received signal to the despreader 1420 only when the RG reception mode is ON. The despreader 1420 despreads the signal with an E-RGCH channelization code CRG. The despread signal is multiplied by an orthogonal code SRG allocated to the UE in a multiplier 1422 and demodulated in a demodulator 1424.

An RG information decider 1426 determines whether the RG received from the demodulator 1424 is 0 (KEEP). If the RG is not 0, the RG information decider 1426 provides a rate-increase or rate-decrease command according to the RG to the E-DCH controller 1412 through a second RG reception switch 1428. Similarly to the first RG reception switch 1614, the second RG reception switch 1428 provides the command to the E-DCH controller 1412 only when the RG reception mode is ON. When not receiving an allowed maximum data rate from the rate information decider 1410, the E-DCH controller 1412 increases or decreases a stored allowed maximum data rate according to the command and selects an E-DCH rate within the changed allowed maximum data rate.

In accordance with the embodiments of present invention as described above, an AG and an RG are efficiently transmitted for an uplink packet data service. Therefore, downlink signaling overhead arising from notifying a UE of an allocated allowed maximum data rate is reduced and interference from signaling AGs is minimized.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of scheduling uplink data transmission for user equipment (UE) in a mobile communication system supporting an uplink packet data service, comprising the steps of:
   receiving from a Node B, an absolute grant (AG) indicating the absolute value of an allowed maximum data rate for uplink data transmission;
   determining whether the AG has a pre-assigned first or second UE-ID;
   receiving from the Node B, a relative grant (RG) indicating a change in the allowed maximum data rate for uplink data transmission, if the AG has the first UE-ID;
   neglecting the RG received from the Node B, if the AG has the second UE-ID; and
   transmitting uplink data within an allowed maximum data rate decided by one of the AG and the RG.

2. The method of claim 1, further comprising the step of, changing, at one time, the allowed maximum data rate to a target data rate indicated by the AG, if the AG has the first UE-ID.

3. The method of claim 1, further comprising the step of, changing, stepwise in each transmission time interval, the allowed maximum data rate to a target data rate indicated by the AG, if the AG has the second UE-ID.

4. The method of claim 1, wherein the first UE-ID is unique to the UE and the second UE-ID is unique to a predetermined UE group that comprises the UE.

5. The method of claim 1, wherein the first UE-ID and the second UE-ID are unique to a predetermined UE group comprising the UE.

6. The method of claim 1, wherein the first UE-ID and the second UE-ID are unique to the UE.

7. The method of claim 1, wherein the determining step comprises the steps of:
   detecting a masked cyclic redundancy check (CRC) attached to the AG;
   demasking the masked CRC with the first UE-ID;
   performing a CRC check on the AG using the CRC demasked with the first UE-ID;
   determining that the AG has the first UE-ID, if the CRC check using the first UE-ID is good;
   demasking the masked CRC with the second UE-ID, if the CRC check using the first UE-ID fails;
   performing a CRC check on the AG using the CRC demasked with the second UE-ID; and
   determining that the AG has the second UE-ID, if the CRC check using the second UE-ID is good.

8. An apparatus for scheduling uplink data transmission for user equipment (UE) in a mobile communication system supporting an uplink packet data service, comprising:

an absolute grant (AG) receiver for receiving from a Node B, an AG indicating the absolute value of an allowed maximum data rate for uplink data transmission;

a controller for managing a pre-assigned first and second UE-IDs, setting a relative grant (RG) reception mode to ON if the AG has the first UE-ID and the RG reception mode to OFF if the AG has the second UE-ID, and determining the allowed maximum data rate for uplink data transmission according to the one of AG and RG; and an RG receiver for receiving an RG from the Node B, when the RG reception mode is set to ON.

9. The apparatus of claim 8, wherein the controller is further for changing, at one time, the allowed maximum data rate to a target data rate indicated by the AG, if the AG has the first UE-ID.

10. The apparatus of claim 8, wherein the controller is further for changing, stepwise in each transmission time interval, the allowed maximum data rate to a target data rate indicated by the AG, if the AG has the second UE-ID.

11. The apparatus of claim 8, wherein the first UE-ID is unique to the UE and the second UE-ID is unique to a predetermined UE group that comprises the UE.

12. The apparatus of claim 8, wherein the first UE-ID and the second UE-ID are unique to a predetermined UE group that comprises the UE.

13. The apparatus of claim 8, wherein the first UE-ID and the second UE-ID are unique to the UE.

14. The apparatus of claim 8, wherein the decider comprises:

a cyclic redundancy check (CRC) detector for detecting a masked CRC attached to the AG; and a CRC checker for demasking the masked CRC with the first UE-ID, performing a CRC check on the AG using the CRC demasked with the first UE-ID, determining that the AG has the first UE-ID, if the CRC check is good, demasking the masked CRC with the second UE-ID, if the CRC check fails, performing a CRC check on the AG using the CRC demasked with the second UE-ID, and determining that the AG has the second UE-ID, if the CRC check is good.

15. A method of scheduling uplink data transmission for user equipment (UE) in a Node B of a mobile communication system supporting an uplink packet data service, comprising the steps of:

allocating a first UE-ID and a second UE-ID for scheduling uplink data transmission;

determining an allowed maximum data rate for the UE, selecting one of the first or second UE-IDs to notify the UE of the allowed maximum data rate, the first UE-ID indicating reception of a relative grant (RG) indicating a change in the allowed maximum data rate and the second UE-ID indicating non-reception of the RG;

generating an absolute grant (AG) indicating the allowed maximum data rate and adding the selected UE-ID to the AG; and transmitting the AG with the selected UE-ID to the UE.

16. The method of claim 15, wherein the first UE-ID indicates that the UE is to change, at one time, the allowed maximum data rate to a target data rate indicated by an AG having the first UE-ID.

17. The method of claim 15, wherein the second UE-ID indicates that the UE is to change, stepwise in each transmission time interval, the allowed maximum data rate to a target data rate indicated by an AG having first UE-ID.

18. The method of claim 15, wherein the first UE-ID is unique to the UE and the second UE-ID is unique to a predetermined UE group comprising the UE.

19. The method of claim 15, wherein the first UE-ID and the second UE-ID are unique to a predetermined UE group comprising the UE.

20. The method of claim 15, wherein the first UE-ID and the second UE-ID are unique to the UE.

21. The method of claim 15, wherein the adding step comprises the steps of:

generating a cyclic redundancy check (CRC) for the AG;
masking the CRC with the selected UE-ID; and
adding the masked CRC to the AG.

22. An apparatus for scheduling uplink data transmission for user equipment (UE) in a Node B of a mobile communication system supporting an uplink packet data service, comprising:

a scheduler for managing first and second UE-IDs allocated for scheduling of uplink data transmission, determining an allowed maximum data rate for the UE and selecting one of the first or second UE-IDs to notify the UE of the allowed maximum data rate, the first UE-ID indicating reception of a relative grant (RG) indicating a change in the allowed maximum data rate and the second UE-ID indicating non-reception of the RG;

a rate information generator for generating an absolute grant (AG) indicating the allowed maximum data rate;

an adder for adding the selected UE-ID to the AG; and a transmitter for transmitting the AG with the selected UE-ID to the UE.

23. The apparatus of claim 22, wherein an AG with the first UE-ID selected indicates that the UE is to change, at one time, the allowed maximum data rate to a target data rate.

24. The apparatus of claim 22, wherein an AG with the second UE-ID selected indicates that the UE is to change, stepwise in each transmission time interval, the allowed maximum data rate to a target data rate.

25. The apparatus of claim 22, wherein the first UE-ID is unique to the UE and the second UE-ID is unique to a predetermined UE group comprising the UE.

26. The apparatus of claim 22, wherein the first UE-ID and the second UE-ID are unique to a predetermined UE group comprising the UE.

27. The apparatus of claim 22, wherein the first UE-ID and the second UE-ID are unique to the UE.

28. The apparatus of claim 22, wherein the adder comprises:

a cyclic redundancy check (CRC) generator for generating a CRC for the AG and masking the CRC with the selected UE-ID; and a CRC adder for adding the masked CRC to the AG.

* * * * *